United States Patent
Watanabe

(10) Patent No.: US 6,486,877 B1
(45) Date of Patent: Nov. 26, 2002

(54) METHOD AND APPARATUS FOR CREATING VIRTUAL ENVIRONMENT, AND RECORD MEDIUM HAVING RECORDED THEREON COMPUTER READABLE PROGRAM FOR CREATING VIRTUAL ENVIRONMENT

(75) Inventor: Nobuyuki Watanabe, Yokohama (JP)

(73) Assignee: Olympus Optical Company, Ltd., Tokyo (JP)

(*) Notice: Subject to any disclaimer, the term of this patent is extended or adjusted under 35 U.S.C. 154(b) by 0 days.

(21) Appl. No.: 09/333,949

(22) Filed: Jun. 16, 1999

(30) Foreign Application Priority Data

Jun. 17, 1998 (JP) .......................................... 10-169760

(51) Int. Cl.[7] .............................................. G06T 17/00
(52) U.S. Cl. ...................................................... 345/420
(58) Field of Search ................................. 345/418, 419, 345/420, 427

(56) References Cited

U.S. PATENT DOCUMENTS 5,396,583 A * 3/1995 Chen et al.

FOREIGN PATENT DOCUMENTS

| JP | 9187038 | 7/1997 |
| JP | 9244522 | 9/1997 |

* cited by examiner

*Primary Examiner*—Almis R. Jankus
(74) *Attorney, Agent, or Firm*—Stevens, Davis, Miller & Mosher, LLP

(57) ABSTRACT

A virtual environment model of an inside of a room is created from a panoramic image thereof by performing the steps of:

arranging the panoramic image on a cylindrical body in a virtual space such that information about an angle of view of the relevant panoramic image is reflected;

arranging a ceiling plane and a floor plane of said room in said virtual space such that the ceiling plane and floor place are brought into contact with an upper plane and a lower plane, respectively of said cylindrical body;

deriving a radius (r) of the cylindrical body from a circumferencial length of said cylindrical body corresponding to a length (L) of said panoramic image and deriving a height (H) of said panoramic image;

setting markers (A', B') on the panoramic image, said markers corresponding to vertices (A, B) of posts at respective corners of the room, at said vertices the posts being brought into contact with the ceiling plane and floor plane, respectively on the virtual space;

deriving heights (a, b) of said markers on the panoramic image; and deriving a distance (Z) from a virtual view point (O) set in the virtual space to a post (A–B) and a height (w) of said virtual view point (O) from said radius (r) of the cylindrical body, said height (H) of the panoramic image and said heights (a, b) of the markers on the panoramic image.

24 Claims, 27 Drawing Sheets

METHOD AND APPARATUS FOR CREATING VIRTUAL ENVIRONMENT, AND RECORD MEDIUM HAVING RECORDED THEREON COMPUTER READABLE PROGRAM FOR CREATING VIRTUAL ENVIRONMENT

BACKGROUND OF THE INVENTION

1. Field of the Invention

The present invention relates to a method and an apparatus for creating a virtual environment for experiencing a virtual feeling of a three dimensional space. The present invention also relates to a record medium having recorded thereon a computer readable program for making a computer to execute procedure for creating a virtual environment.

2. Description of the Related Art

Heretofore, there have been proposed various methods of creating a three dimensional virtual space by means of a computer graphics. For instance, in Japanese Patent Application Laid-open Publication Kokai Hei 9-187038, there is disclosed a virtual space creating method, in which an object is picked-up by an image picking-up means at different picking-up positions such that a part of the object is picked-up in a duplicated manner to obtain a plurality of images, parameters are calculated in accordance with respective picking-up positions as well as respective positions of an imaging lens, distance distributions of the object are derived by said plurality of images and parameters, and reconstructing a three dimensional model of the object by successively organizing said distance distributions and images by means of said parameters.

In Japanese Patent Application Laid-open Publication Kokai Hei 9-244522, there is disclosed a three dimensional space creating method, in which three dimensional geometric data of an architecture is formed from plan views of the architecture by means of a separate modeling software, the thus obtained three dimensional geometric data is placed on a cylindrical space which represents a surrounding landscape, image mapping data is produced by denoting mappings between vertices in the three dimensional geometric data and corresponding characteristic points on photographs of an inside of the architecture and panoramic photographs of the landscape taken from terraces, and these three dimensional geometric data and image mapping data are stored as virtual space creating data. Upon creating the virtual three dimensional space, the three dimensional geometric data is projected on the image, and at the same time image information denoted by the image mapping data is displayed by texture mapping.

In the virtual space creating method described in the above mentioned Kokai Hei 9-187038, in order to derive the distance distributions of the object, for each of a plurality of images obtained by picking-up the object, it is necessary to detect a pick-up position and a lens position of the picking-up means. This necessitates rather cumbersome and time-consuming work. Furthermore, in this method, the three dimensional data may be taken into the computer with the aid of rather expensive distance measuring device such as a range finder, and therefore a cost of a whole system is liable to increase.

In the virtual space creating method described in the above Kokai Hei 9-244522, it is necessary to generate the three dimensional data of the architecture by means of plan views of the architecture and separate three dimensional modeling software. This modeling work is cumbersome and a user is subjected to a lot of work and time.

SUMMARY OF THE INVENTION

A first object of the present invention is to provide a method of creating a virtual environment in a simple manner.

A second object of the invention is to provide a virtual environment creating apparatus, in which the above mentioned virtual environment creating method can be carried out by means of a simple and less expensive structure.

Further, a third object of the present invention is to provide a record medium having recorded thereon a computer readable program which is to make a computer to execute procedure for creating a virtual environment in a simple manner.

A fourth object of the invention is to provide a computer data signal embodied in a carrier wave, wherein said computer data signal is constructed by computer readable program codes for producing a virtual environment from a panoramic image of an inside of an architecture or room in a simple manner.

According to the invention for attaining the above mentioned first object, a method of creating a virtual environment comprises:

a step of arranging a panoramic image of an inside of a room picked-up from a single view point on a cylindrical body in a virtual space such that information about an angle of view of the relevant panoramic image is reflected;

a step of arranging a ceiling plane and a floor plane of said room in said virtual space such that the ceiling plane and floor place are brought into contact with an upper plane and a lower plane, respectively of said cylindrical body;

a step of deriving a radius (r) of the cylindrical body from a circumferencial length of said cylindrical body corresponding to a length (L) of said panoramic image;

a step of deriving a height (H) of said panoramic image;
a step of setting markers (A', B') on the panoramic image, said markers corresponding to vertices (A, B) of a plurality of posts defining a shape of said virtual space, at said vertices the respective posts being brought into contact with the ceiling plane and floor plane, respectively on the virtual space;

a step of deriving heights (a, b) of said markers on the panoramic image; and a step of deriving distances (Z) from a virtual view point (O) set in the virtual space to said posts (A–B line) and a height (w) of said virtual view point (O) from said radius (r) of the cylindrical body, said height (H) of the panoramic image and said heights (a, b) of the markers on the panoramic image;

wherein a virtual environment model of the inside of said room is created in accordance with said panoramic image.

In an embodiment of the virtual environment creating method according to the invention, in order to correct a variation in the height of view points during the production of the panoramic image, information about a height of another virtual view point in a direction of a line of sight which situates, viewed in a rotational direction on a horizontal plane, between lines of sight which have been used for deriving the heights of virtual view points is derived by an interpolation from the previously derived heights of the virtual view points.

In another preferable embodiment of the virtual environment creating method according to the invention, in order to correct a variation in a horizontal position of view points during the formation of the panoramic image, a position of a virtual view point having a viewing direction corresponding to a beam in the above mentioned virtual environment model created from the panoramic image is shifted in the horizontal plane on which said virtual view point is existent such that the beam is corrected to be straight in the virtual space.

In an embodiment of the method according to the invention, in order to utilize data of the panoramic image as texture information without preparing separate texture information, image information at a position of the panoramic image is texture-mapped as surface information onto a corresponding position of the virtual environment model constructed from the panoramic image.

According to the invention, a method of creating a virtual environment comprises:

a step of arranging a panoramic image of an inside of a room picked-up from a single view point on a cylindrical body in a virtual space such that information about an angle of view of the relevant panoramic image is reflected;

a step of arranging at least one of a ceiling plane and a floor plane of said room on said virtual space such that at least one of the ceiling plane and floor place is brought into contact with at least one of an upper plane and a lower plane of said cylindrical body;

a step of deriving a radius (r), a circumferencial length (L) and a height (H) of the cylindrical body as well as an angle of view ($\theta$) at which said panoramic image is picked-up;

a step of setting, on the panoramic image, markers corresponding to vertices (A, B) of at least one post defining a shape of the virtual space, at said vertices the post being brought into contact with the ceiling plane and floor plane, respectively of the virtual space;

a step of deriving heights (a, b) of said markers on the panoramic image; and a step of setting a position of the view point (H/2) of said panoramic image, and deriving a distance (Zp) from a virtual view point (O) in the virtual space to said post (A–B line) and a height (w) of said virtual view point (O) as well as a height (h) of said room in the virtual space from said position of the view point (H/2), said radius (r) of the cylindrical body and said heights (a, b) of said markers on the panoramic image;

wherein a virtual environment model within said room is created from said panoramic image.

In an embodiment of the above mentioned method according to the invention, a distance from the view point to the post in the virtual space is corrected under such a condition that said virtual environment model has a rectangular shape surrounded by four walls.

In another embodiment of the method according to the invention, in order to utilize data of the panoramic image information as texture information, said cylindrical body is corrected into a curved surface which is based on said angle of view, the image information of the panoramic image on the thus corrected curved surface is utilized as texture and is pasted as surface information at a corresponding point of the virtual environment model reconstructed from the panoramic image.

According to the invention, a method of creating a virtual environment comprises:

a step of arranging a panoramic image of an inside of an architecture picked-up from a single view point on a cylindrical body in a virtual space such that information about an angle of view of the relevant panoramic image is reflected, a step of arranging two mutually parallel virtual planes of said architecture in said virtual space such that said two virtual planes are brought into contact with an upper plane and a lower plane, respectively of said cylindrical body;

a step of deriving a radius of the cylindrical body from a circumferencial length of said panoramic image arranged on the circumferencial surface of the cylindrical body;

a step of deriving a height of said panoramic image;

a step of setting markers on the panoramic image, said markers corresponding to points which situates on said two mutually parallel virtual planes at a same horizontal position;

a step of deriving heights of said markers on the panoramic image; and a step of deriving a distance from a virtual view point in the virtual space to a straight line connecting said points on said two mutually parallel virtual planes at the same horizontal position and a height of said virtual view point from said radius of the cylindrical body, said height of the panoramic image and said heights of the markers on the panoramic image;

wherein a virtual environment model of the inside of said architecture is created from said panoramic image.

According to the invention, a method of creating a virtual environment comprises:

a step of arranging a panoramic image of an inside of an architecture picked-up from a single view point on a cylindrical body in a virtual space such that information about an angle of view of the relevant panoramic image is reflected;

a step of arranging at least one virtual plane within said architecture in said virtual space such that said at least one virtual plane is brought into contact with at least one of an upper plane and a lower plane of said cylindrical body;

a step of deriving a radius, a circumferencial length and a height of the cylindrical body as well as an angle of view at which said panoramic image is picked-up;

a step of setting, on the panoramic image, at least one marker corresponding to a point at which said at least one virtual plane intersects a straight line at right angles;

a step of deriving a height of said at least one marker on the panoramic image; and a step of deriving a distance from a virtual view point in the virtual space to said straight line which intersects perpendicularly said at least one virtual plane and a height of said view point as well as a height of the inside of said architecture in the virtual space from said virtual view point, said radius of the cylindrical body and said height of said at least one marker in the panoramic image;

wherein a virtual environment model within said architecture is generated on the basis of said panoramic image.

wherein a virtual environment of the inside of said architecture is created on the basis of said panoramic image.

In order to achieve the second object of the invention, a virtual environment creating apparatus comprises:

an image display means for displaying a panoramic image;

a means of setting markers on the panoramic image, said markers corresponding to vertices of at least one post at which the post is brought into contact with a ceiling plane and a floor plane, respectively in a virtual space; and a means for creating a virtual environment model corresponding to said panoramic image from the panoramic image and positional information of said markers on the panoramic image.

In order to attain the third object of the invention, a computer readable record medium, having a program recorded thereon, wherein said program is to make the computer execute the following procedures for producing a virtual environment from a panoramic image of an inside of a room picked-up from a single view point;

- to arrange said panoramic image on a cylindrical body in a virtual space such that information about an angle of view of the relevant panoramic image is reflected and upper and lower planes of said cylindrical body are brought into contact with ceiling and floor planes, respectively of said room;
- to derive a circumferencial length, a radius and a height of said cylindrical body;
- to derive heights of markers set on the panoramic image, said markers corresponding to vertices of at least one post defining a shape of the virtual space, at said vertices the post being brought into contact with the ceiling plane and floor plane, respectively in the virtual space; and
- to derive a distance from a virtual view point in the virtual space to said post and a height of said virtual view point from said radius and height of the cylindrical body and said heights of said markers in the panoramic image and to create the virtual environment model of the inside of the room from said panoramic image.

According to the invention, a computer readable record medium, having a program recorded thereon, wherein said program is to make the computer execute the following procedures for producing a virtual environment from a panoramic image of an inside of a room picked-up from a single view point;

- to arrange said panoramic image on a cylindrical body in a virtual space such that information about an angle of view of the relevant panoramic image is reflected and at least one of upper and lower planes of said cylindrical body is brought into contact with at least one of ceiling and floor planes of said room;
- to derive a circumferencial length, a radius and a height of said cylindrical body as well as an angle of view with which said panoramic image is picked-up;
- to derive heights of markers set on the panoramic image, said markers corresponding to vertices of at least one post, at said vertices the post is brought into contact with the ceiling plane and floor plane, respectively in the virtual space; and
- to derive a distance from a virtual view point in the virtual space to said post and a height of said view point from a position of said virtual view point set on the panoramic image, said radius of the cylindrical body and said heights of said markers on the panoramic image and to create the virtual environment of the inside of said room from the panoramic image.

According to the invention, a computer readable record medium, having a program recorded thereon, wherein said program is to make the computer execute the following procedures for producing a virtual environment from a panoramic image of an inside of an architecture picked-up from a single view point;

- to arrange said panoramic image on a cylindrical body in a virtual space such that information about an angle of view of the relevant panoramic image is reflected and upper and lower planes of said cylindrical body are brought into contact with two mutually parallel virtual planes within said architecture;
- to derive a circumferencial length, a radius and a height of said cylindrical body;
- to derive heights of markers set on the panoramic image, said markers corresponding to points which situates on said two mutually parallel virtual planes at the same horizontal position; and
- to derive a distance from a virtual view point in the virtual space to a straight line connecting said two points on said two mutually parallel virtual planes and a height of said virtual view point from said radius and height of the cylindrical body and said heights of said markers on the panoramic image and to create the virtual environment model of the inside of the architecture from said panoramic image.

According to the invention, a computer readable record medium, having a program recorded thereon, wherein said program is to make the computer execute the following procedures for producing a virtual environment from a panoramic image of an inside of an architecture picked-up from a single view point;

- to arrange said panoramic image on a cylindrical body in a virtual space such that information about an angle of view of the relevant panoramic image is reflected and at least one of upper and lower planes of said cylindrical body is brought into contact with at least one of two mutually parallel virtual planes within said architecture;
- to derive a circumferencial length, a radius and a height of said cylindrical body as well as an angle of view with which said panoramic image is picked-up;
- to derive heights of at least one marker set on the panoramic image, said at least one marker corresponding to a cross point between said at least one of two mutually parallel virtual planes and a straight line which intersects said virtual plane at right angles in the virtual space; and
- to derive a distance from a virtual view point in the virtual space to said straight line and a height of an inside of the architecture from a position of said virtual view point set on the panoramic image, said radius of the cylindrical body and said height of said at least one marker on the panoramic image, and to create the virtual environment model from said panoramic image.

According to the invention, in order to attain said fourth object, a computer data signal embodied in a carrier wave, wherein said computer data signal is constructed by computer readable program codes for producing a virtual environment from a panoramic image of an inside of an architecture picked-up from a single view point comprises:

- a computer readable program code for arranging said panoramic image on a cylindrical body in a virtual space such that information about an angle of view of the relevant panoramic image is reflected and arranging two mutually parallel virtual planes in said architecture on said virtual space such that said two virtual planes are brought into contact with an upper plane and a lower plane, respectively of said cylindrical body;
- a computer readable program code for deriving a radius, a height and a circumferencial length of said cylindrical body;
- a computer readable program code for deriving heights of markers on the panoramic image, said markers being set at positions on the panoramic image corresponding to two points which situate on said two mutually parallel virtual planes at the same horizontal position; and a computer readable program code for deriving a distance from a virtual view point in the virtual space to a straight line connecting said two points on said two mutually parallel virtual planes at the same horizontal position and a height of said virtual view point from said radius and height of the cylindrical body and said heights of said markers on the panoramic image to create a virtual environment model of the inside of said architecture.

According to the invention, a computer data signal embodied in a carrier wave, where said computer data signal is constructed by computer readable program codes for creating a virtual environment from a panoramic image of an inside of an architecture picked-up from a single view point comprises:

a computer readable program code for arranging said panoramic image on a cylindrical body in a virtual space such that information about an angle of view of the relevant panoramic image is reflected and at least one of upper and lower planes of said cylindrical body is brought into contact with at least one of two mutually parallel virtual planes in said architecture within said virtual space;

a computer readable program code for deriving a circumferencial length, a radius and a height of said cylindrical body as well as an angle of view with which said panoramic image is picked-up;

a computer readable program code for deriving a height of at least one marker-set on the panoramic image, said at least one marker corresponding to a cross point between said at least one of two mutually parallel virtual planes and a straight line which intersects said virtual plane at right angles; and a computer readable program code for deriving a distance from a virtual view point in the virtual space to said straight line and a height of an inside of the architecture from a position of said virtual view point set on the panoramic image, said radius of the cylindrical body and said height of said at least one marker on the panoramic image to create a virtual environment of the inside of said architecture.

DESCRIPTION OF THE PREFERRED EMBODIMENT

Figure 1:
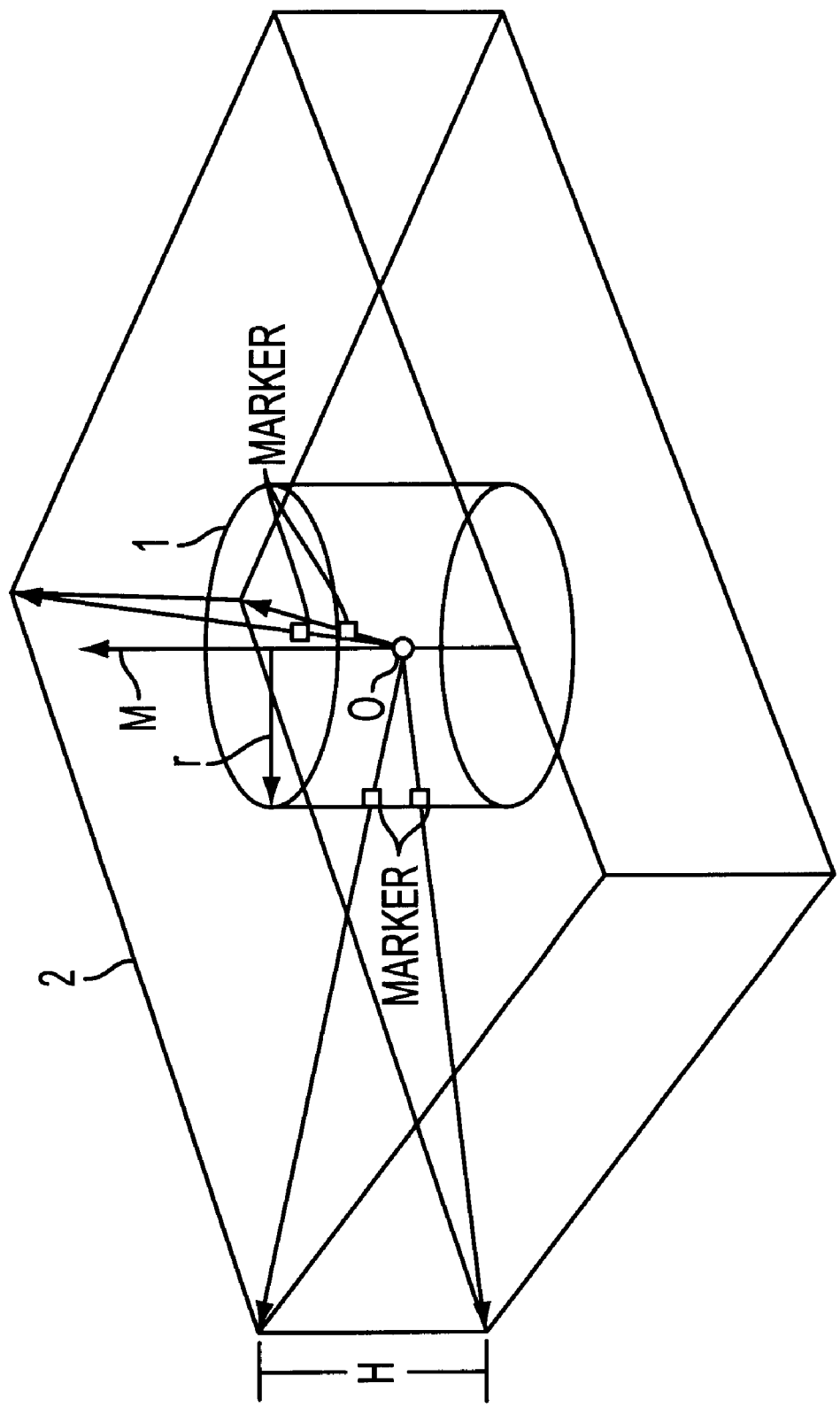
FIG. 1 is a schematic diagram showing a positional relationship between a panoramic image and a reconstructed 3D model in a first embodiment of the virtual environment creating method according to the invention.

Now the present invention will be explained in detail with reference to embodiments shown in the drawings, but it should be noted that the present invention is not limited to these embodiments, but may be modified in various ways within the scope of the invention.

FIG. 1 is a schematic diagram showing a positional relationship between a panoramic image and a three-dimensional (3D) model to be reconstructed in a first embodiment of the virtual environment creating method according to the invention. A panoramic image is an image picked-up over a whole surrounding by 360 degrees, and is a planer image obtained by projecting an object onto a side wall of a cylindrical body situating at a finite distance from a view point. Now it is assumed that the cylindrical body has a height H and a width L. Then, the panoramic image may be considered as a three-dimensional object, in which an object outside the cylindrical body is mapped as a texture on an inner side wall of the cylindrical body having the height H and radius r. In this case, the height H and width L of the panoramic image may be derived from the numbers of pixels of the panoramic image aligned in the horizontal and vertical directions, respectively. Furthermore, the radius r of the cylindrical body may be calculated from r=L/2π.

In the present embodiment, a panoramic image of an inside of an architecture, e.g. inside of a room, picked-up from a single view point is arranged on a cylindrical body 1 within a reconstructed 3D model 2 representing an inside of a room such that information about an angle of view of the panoramic image is reflected. The cylindrical body 1 of the panoramic image is arranged such that upper and lower planes of the cylindrical body are brought into contact with ceiling and floor, respectively of the room of the 3D model 2. The 3D model 2 can be reconstructed by moving a virtual view point. Therefore, in this case, a height of the 3D model 2 becomes H. A three dimensional space reconstructed by utilizing the cylindrical image of the panoramic image as a standard for scale is called a virtual space $R^3$.

Figure 2:
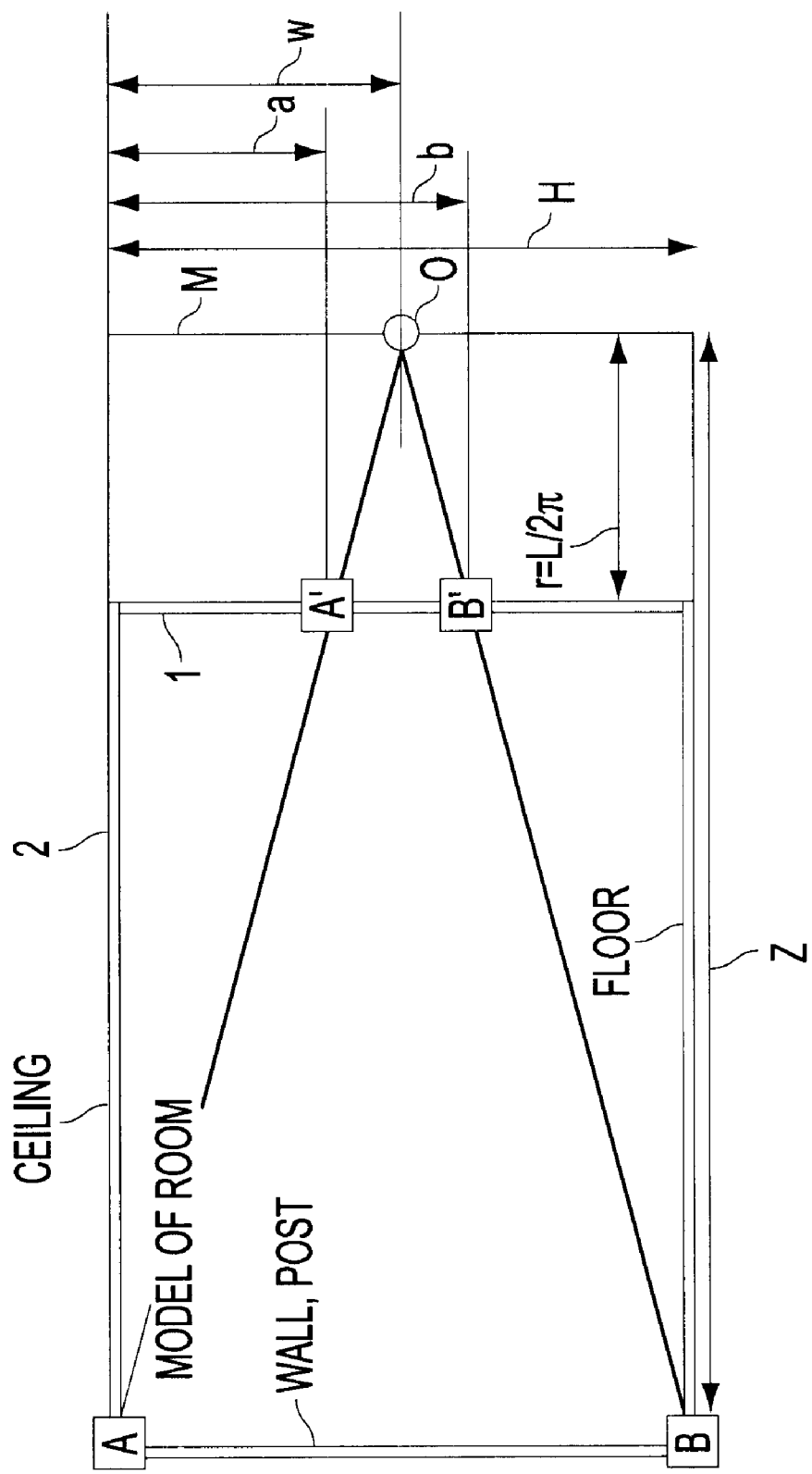
FIG. 2 is a schematic cross section view explaining the manner of reconstructing the 3D model in the first embodiment according to the invention.

FIG. 2 is a schematic diagram explaining the reconstruction of the 3D model 2 in the first embodiment of the virtual environment creating method according to the invention. In the present embodiment, the virtual space $R^3$ shown in FIG. 1 is assumed to be a conventional rectangular room surrounded by four walls and virtual posts or pillars are existent at four corners defined by adjacent walls. In FIG. 2, a vertex of a post in the virtual space $R^3$ at which the post is brought into contact with the ceiling is denoted as A, and a vertex at which the post is brought into contact with the floor at the same horizontal position is represented by B. Positions on the cylindrical body 1 of the panoramic image corresponding to said vertices A and B are denoted as A' and B', respectively. These points A' and B' constitute markers corresponding to the vertices A and B, respectively. When the practical panoramic image contains posts at four corners, the markers A' and B' correspond to positions at which the post is brought into contact with the ceiling and floor of the room. Therefore, in FIG. 1, a user can enter markers simply by denoting the above points on the panoramic image. It should be noted that a shape of the room is not limited to rectangular as long as the room is defined by upper and lower horizontal planes. For instance, the room may be cylindrical or polygonal other than rectangular. The vertical positions a and b of these markers are derived from the number of pixels in the vertical direction. It should be noted that when the panoramic image does not contain a post at a corner, a virtual post may be considered on the panoramic image, and then the markers may be inputted by denoting positions at which the virtual post is brought into contact with the ceiling and floor.

Now it is assumed that coordinates in the vertical direction in the virtual space $R^3$ are taken such that a positive direction z is directed downward in the plane of the drawing and a zero point of the vertical position is set at the uppermost position of the virtual space $R^3$. Then, a view point O from which the panoramic image is to be seen may be defined as a cross point of straight lines connecting the vertices A and B and the markers A' and B', respectively on a center line M of the cylindrical body 1. When it is further assumed that a single view point from which the panoramic image has been picked-up or constructed does not fluctuates. Then, said point of view O becomes identical with said single view point and is existent on the center line M. However, in general, the point of view O set in the virtual space is not coincided with the single view point on the panoramic image, and thus the view point O in the virtual space is also called a virtual view point. A height w of the virtual point O is not known. Furthermore, distances Z from the center line M to the respective vertices A and B are also not known. The height w of the view point O and the distances Z may be derived by the following equation (1) by utilizing the geometric similarity of triangle under such a condition that the distance from the view point O to the panoramic image is identical with the radius L/2π of the cylindrical body.

$$\frac{L/2\pi}{Z} = \frac{w-a}{w} = \frac{b-w}{H-w} \qquad (1)$$

$$\Rightarrow w = \frac{a \cdot H}{H+a-b}$$

$$\Rightarrow Z = \frac{w \cdot L/2\pi}{w-a}$$

From the thus derived height w and distances Z, coordinates of respective view points of the 3D model 2 and coordinates of the respective vertices may be derived.

In this manner, by corresponding the vertices A and B of the object to the vertices on the ceiling and floor of the virtual space $R^3$ for respective posts denoted by the markers, the 3D model 2 may be reconstructed by connecting these vertices.

Figure 3:
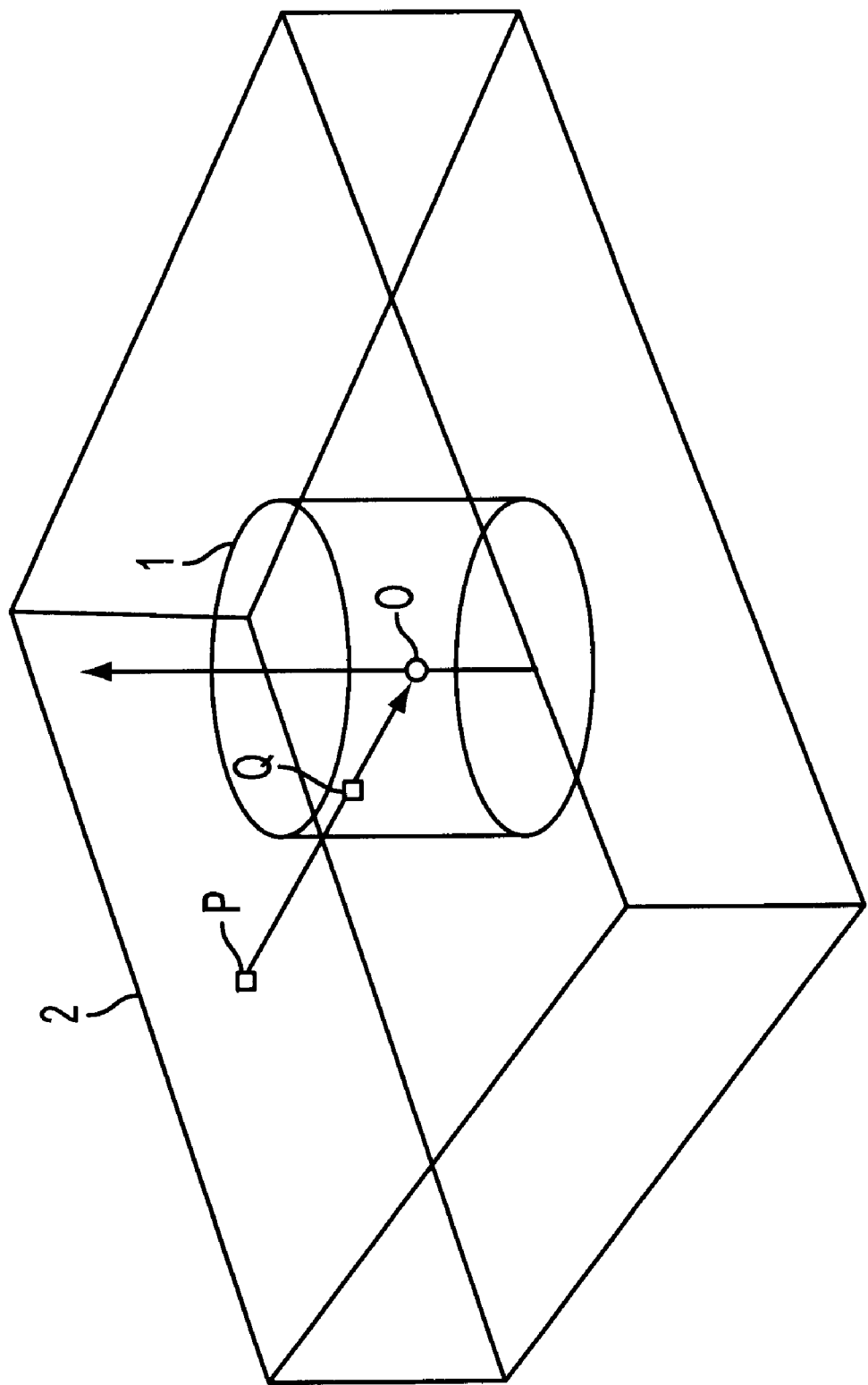
FIG. 3 is a schematic diagram illustrating a texture mapping of the 3D model in the first embodiment according to the invention.

After reconstructing the 3D model 2 in the manner explained above, the texture mapping of the 3D model is performed. That is to say, as illustrated in FIG. 3, a point at which a straight line connecting a point Q on the cylindrical body 1 of the panoramic image and the view point O intersects the 3D model 2 is denoted as P. Pixel information of the point Q is mapped onto the point P. Now an example of an actual algorithm for executing this mapping will be explained.

Figure 4:
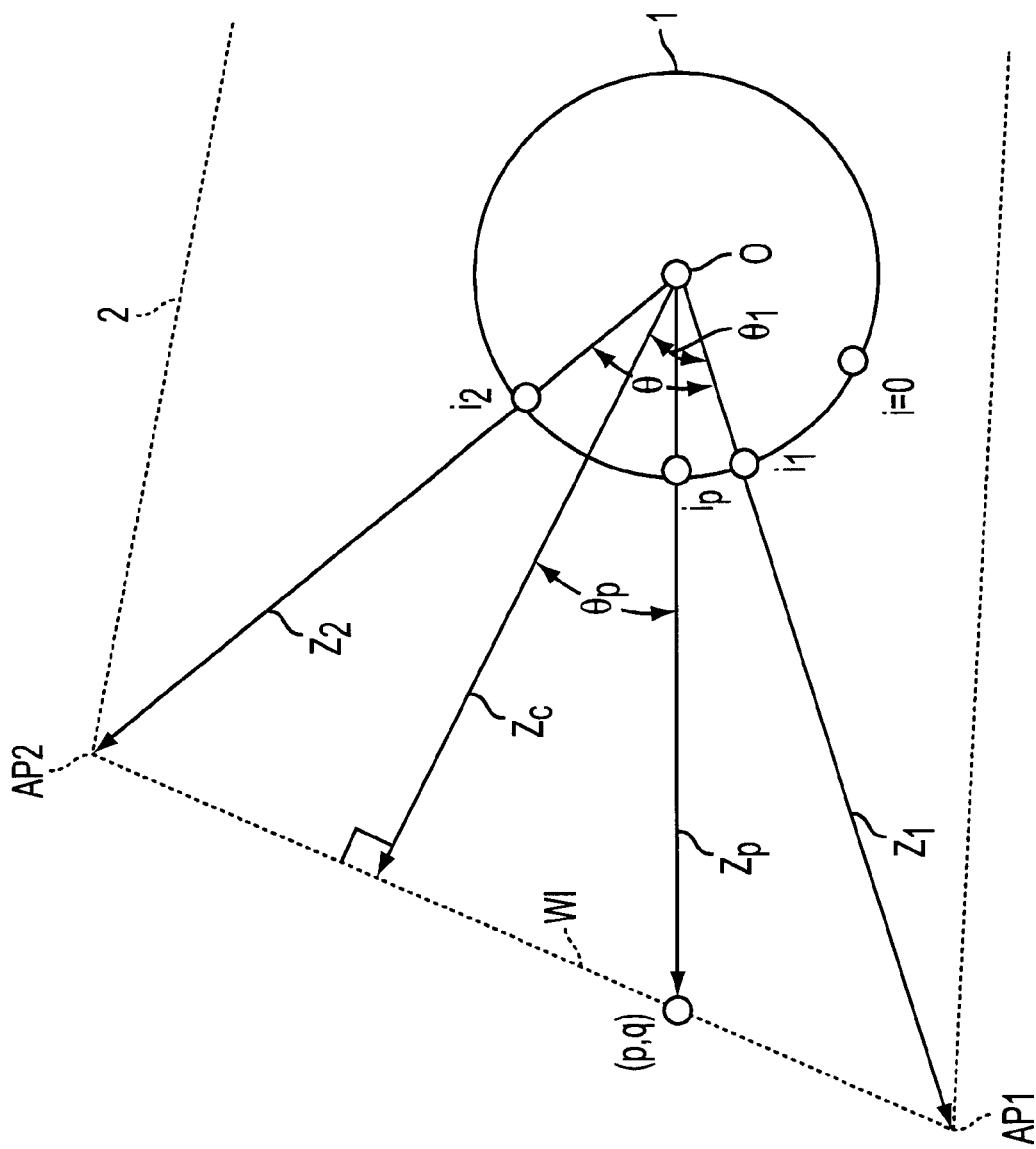
FIG. 4 is a schematic diagram depicting a positional relationship in the texture mapping between a position of a wall of the 3D model and a position of pixel of the panoramic image, while a cylindrical body is seen from its top.

FIG. 4 is a schematic diagram showing the cylindrical body 1 of the panoramic image viewed from its top in order to illustrate positional relationship between a position (p, q) of the side wall of the 3D model 2 and a pixel position ($i_p$, $i_q$) of the panoramic image. It should be noted that (p, q)

represents a pixel array on the side wall, and an upper left point is denoted as a start point (0, 0). It is assumed that distances from the view point O to the vertices AP1 and AP2 are denoted as $Z_1$ and $Z_2$, respectively, a distance from the view point O to a side wall portion bounded by the vertices AP1 and AP2 is re-presented by $Z_c$, horizontal coordinates of the markers corresponding to the vertices AP1 and AP2 are expressed by $i_1$ and $i_2$, respectively, an angle formed by straight lines O–AP1 and O–AP2 is denoted by $\theta$, and an angle formed between straight lines O–$Z_1$ and O–$Z_c$ is represented by $\theta_1$. Then, $Z_c$ may be derived from the following equation (2).

$$Zc = Z_2 \cos(\theta - \theta_1) = Z_1 \cos\theta_1 \qquad (2)$$

$$= Z_2 \cos\left(2\pi \frac{i_2 - i_1}{L} - \theta_1\right)$$

$$= Z_2 \left\{ \cos\left(2\pi \frac{i_2 - i_1}{L}\right) \cdot \cos\theta_1 + \sin\left(2\pi \frac{i_2 - i_1}{L}\right) \cdot \sin\theta_1 \right\}$$

From this equation (2), $\theta_1$ may be Given by the following equation (3).

$$\cos\theta_1 = \left(\frac{II^2}{I^2 + II^2}\right)^{1/2} \qquad (3)$$

wherein $$I = Z_2 \cos\left(2\pi \frac{i_2 - i_1}{L}\right) - Z_1$$

$$II = Z_2 \sin\left(2\pi \frac{i_2 - i_1}{L}\right)$$

By utilizing this relationship, the pixel position of the panoramic image corresponding to a position (p, q) on the wall of the virtual space may be derived from the following equation (4).

$$i_p = \frac{(\theta_1 - \theta_p) \cdot L}{2} + i_1, \qquad Z_p = \frac{Zc}{\cos\theta_p} \qquad (4)$$

wherein $$\theta_p = \tan^{-1}\left(\frac{Zc \tan\theta_1 - p}{Zc}\right)$$

From the positional relationship between the view point and the side wall, (Zc tan $\theta_1$–p/Zc) is guaranteed to be within ±90°.

Figure 5:
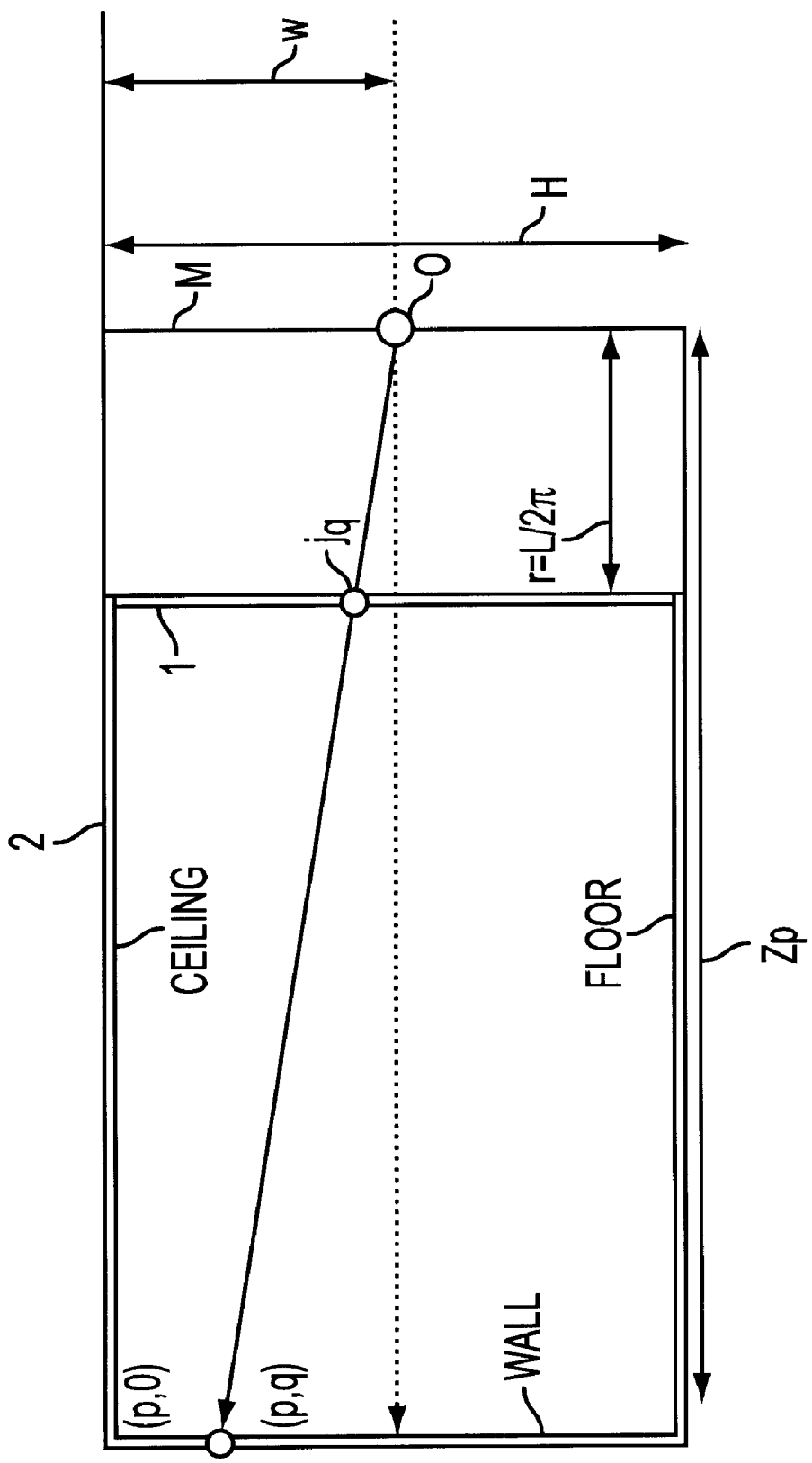
FIG. 5 is a schematic diagram representing a positional relationship in the texture mapping between a position of the wall of the cylindrical body on a plane which includes a view point and a look-at point of the 3D model and is perpendicular to a floor.

FIG. 5 is a schematic diagram showing the texture mapping viewed on a plane which includes a straight line connecting the view point O to the observation point (p, q) and is perpendicular to the floor. As explained above with reference to FIG. 2, a vertical direction index $j_q$ of the panoramic image is given by the following equation (5) utilizing the geometric similarity of triangle.

$$j_q = w + \frac{(Q - w) \cdot L}{2\pi \cdot Z_p} \qquad (5)$$

Figure 6:
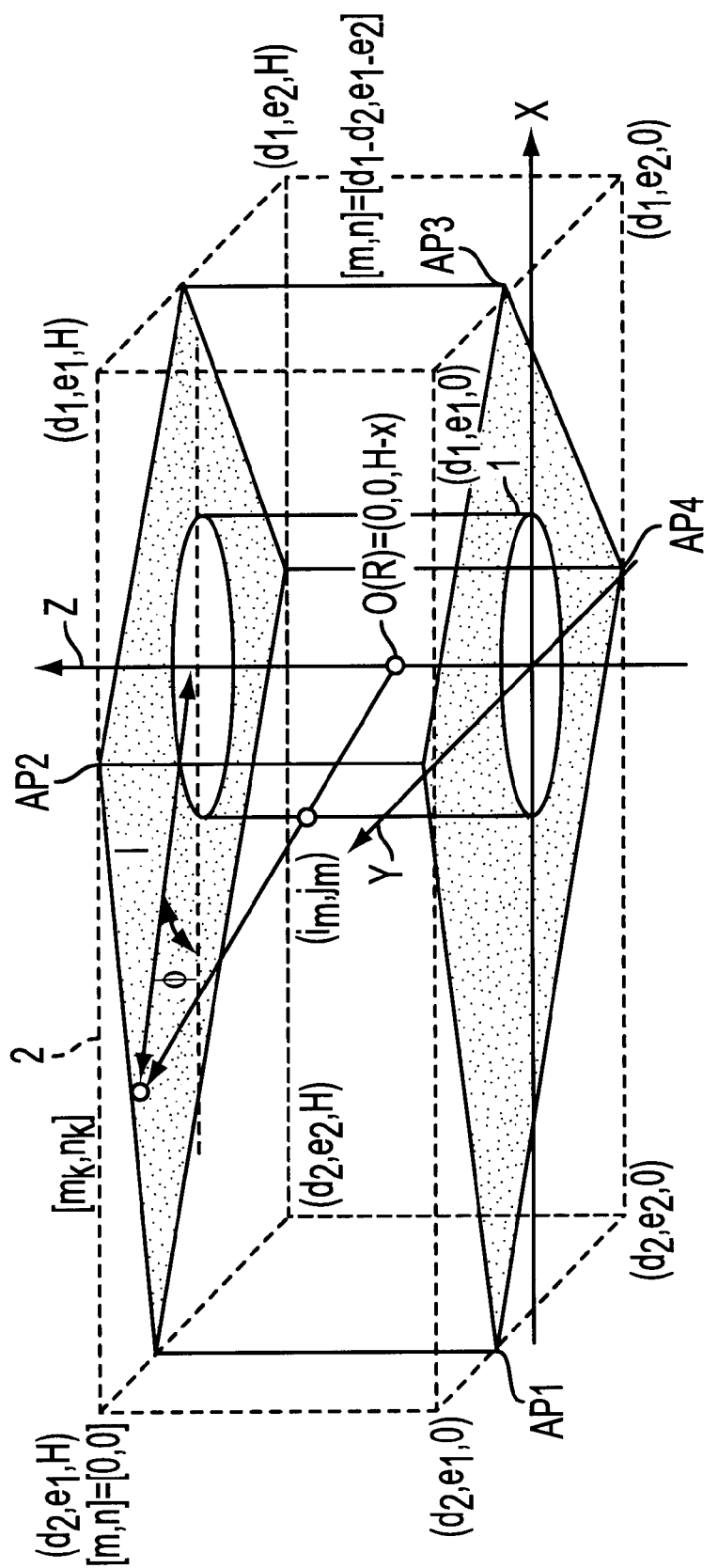
FIG. 6 is a schematic diagram explaining the texture mapping between a ceiling portion and a floor portion of the 3D model.

FIG. 6 depicts the texture mapping at the ceiling portion and floor portion of the 3D model 2. The cylindrical body 1 of the panoramic image is arranged such that its center line R situates at a point (x, y)=(0, 0) and the left hand end of the panoramic image corresponds to a point (x, y)=(-L/2$\pi$, 0). Within such coordinates, it is considered a minimum rectangular containing all the vertices of the 3D model 2 given by the above mentioned equation (1). In this case, a ceiling of the rectangular has coordinates ($d_2$, $e_1$, H), ($d_1$, $e_1$, H), ($d_2$, $e_2$, H), ($d_1$, $e_2$, H), and the floor has coordinates ($d_2$, $e_1$, 0), ($d_1$, $e_1$, 0), ($d_2$, $e_2$, 0), ($d_1$, $e_2$, 0), wherein $d_1$>0, $d_2$<0, $e_1$>0, $e_2$<0.

In this manner, when the pixel information of the ceiling and floor of the rectangular is denoted by an array [m, n], [m, n] may be expressed by array from [0, 0] to [$d_1$–$d_2$, $e_1$–$e_2$]. Now it is assumed that distances from the center line to respective vertices are denoted by $Z_k$ (k=1, . . . ,N). Then, $d_1$, $d_2$, $e_1$, $e_2$ may be given as follows.

maximum and minimum values of $$|\vec{Z}_k|\cos\pi\left(1 - \frac{2i_k}{L}\right) \qquad (k = 1, \ldots N)$$

maximum and minimum values of $$|\vec{Z}_k|\sin\pi\left(1 - \frac{2i_k}{L}\right) \qquad (k = 1, \ldots N)$$

In the coordinate system having the reference point (0, 0) of the view point, a distance l from the center line R of the cylindrical body 1 to coordinates expressed by a series of [$m_k$, $n_k$] is given as follows.

$$l = \{(-d_2 - m_k)^2 + (e_1 - n_k)^2\}^{1/2}$$

The angle $\phi$ with an origin at the left hand end of the image is expressed as follows.

$$\phi = \tan^{-1}\left(\frac{e_1 - n_k}{d_2 - m_k}\right)$$

Furthermore, the pixel position of panoramic original image (cylindrical body) $i_m$ and $j_m$ corresponding to the [$m_k$, $n_k$] may be expressed as follows.

$$i_m = \frac{\phi \cdot L}{2\pi} \qquad (6)$$

$$j_m = w \cdot \frac{l - L/2\pi}{l} : \text{ceiling}$$

$$= H - (H - w) \cdot \frac{l - L/2\pi}{l} : \text{floor}$$

Figure 7:
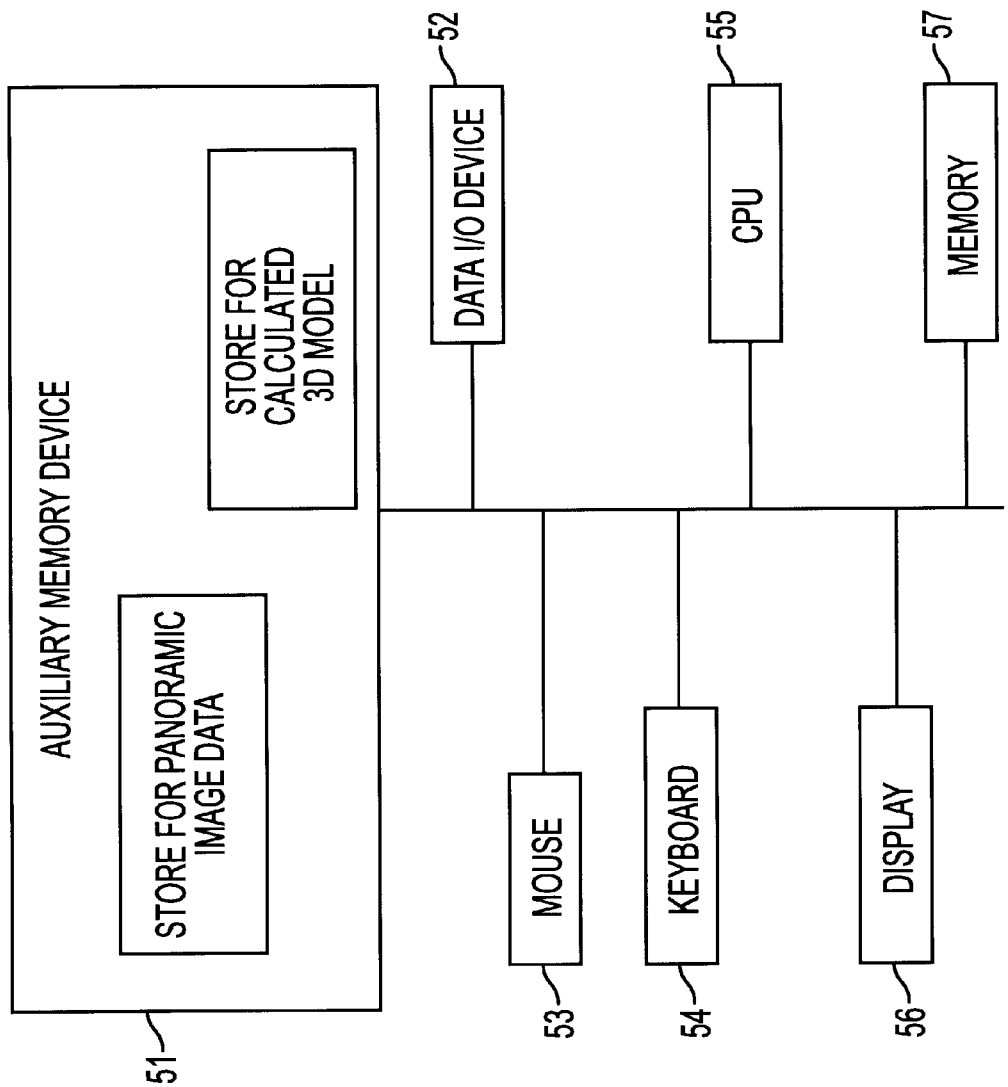
FIG. 7 is a block diagram representing a structure of an embodiment of the apparatus for performing an embodiment of the virtual environment creating method according to the invention.

FIG. 7 is a block diagram illustrating an embodiment of the virtual environment creating apparatus according to the invention for carrying out the above explained first embodiment of the virtual environment creating method according to the invention. The virtual environment creating apparatus comprises an auxiliary memory device 51, data input/output device 52, mouse 53 and keyboard 54 serving as user interface devices, CPU 55, display monitor 56 and memory 57. The auxiliary memory device 51 contains a storage for the panoramic image data and calculated 3D model data. The data input/output device 52 functions for entering the panoramic image data from, for instance a digital camera and for outputting the calculated 3D model data to an external device. The panoramic image data entered from the data input/output device 52 may be stored in the memory 57 not via the auxiliary memory device 51. The mouse 53 may be used for denoting characteristic points on the panoramic image as well as for processing the image. By means of the keyboard 54, it is possible to denote a file name of an image to be inputted or outputted and one or more parameters of the image processing. The CPU 55 can perform the management of data input/output, the management of the graphical user interface and the calculation for converting the panoramic image into the 3D model. The display 56 is used for displaying the graphical user interface, and a user can extract and denote characteristic points of the panoramic image by means of the mouse 53 while monitoring the displayed image. It should be understood that the it is possible to utilize any kind of pointing devices such as pen tablet, joy stick and track ball instead of the mouse 53. The memory 57 stores the panoramic image data, 3D model data, and data used for performing the calculation for converting the panoramic image into the 3D model.

Figure 8:
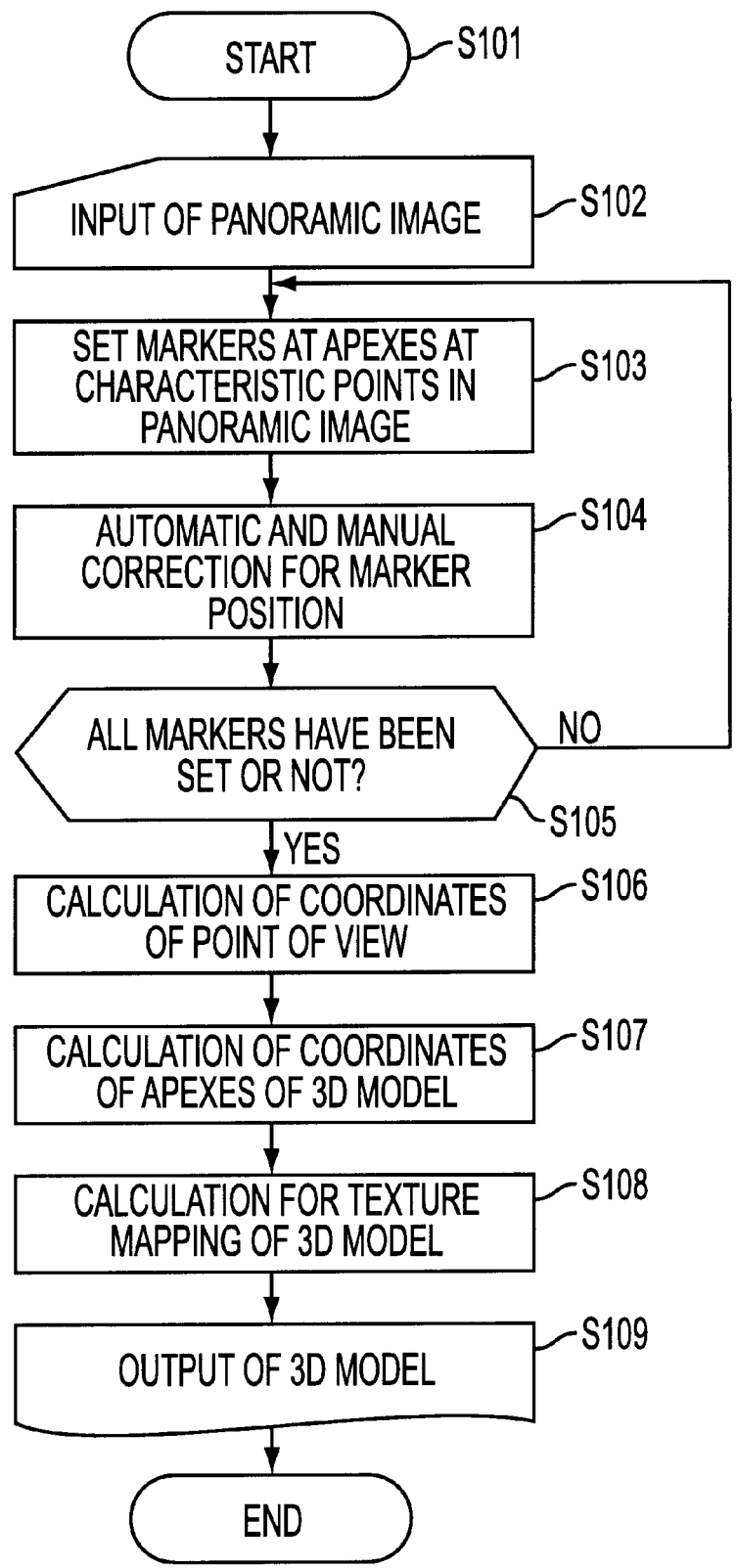
FIG. 8 is a flow chart showing an operation of the apparatus shown in FIG. 7.

Now the operation of the virtual environment creating apparatus shown in FIG. 7 will be explained with reference to a flow chart illustrated in FIG. 8. At first, in a step S101, and a graphical user interface is displayed on the display monitor 56 and ask a user to input a panoramic image or parameters for automatically inputting panoramic image data are prepared. In a next step S102, the panoramic image data is loaded and is displayed on the display monitor 56. Then, in a step S103, characteristic points (vertices) at which a particular object such as a post in the panoramic image is bought into contact with ceiling and floor, are denoted as markers.

After that, in a step S104, the CPU 55 checks whether or not the denoted marker positions contain inconsistency, and if there is inconsistency, it is automatically corrected or a user is requested to alter the marker positions. In the present embodiment, a distortion of the panoramic image in a lateral direction is not taken into consideration, and therefore the automatic correction of the marker positions is carried out such that paired markers at the ceiling and floor have the same horizontal position in the virtual space. Next, in a step S105, it is confirmed that markers have been set at all the necessary positions, and if not, the operation is repeated from the step S103.

When the condition in the step S105 has been satisfied, in a next step S106, coordinates of a view point O are calculated from the marker positions in accordance with the above mentioned equation (1). In a step S107, coordinates of the vertices on the virtual space $R^3$ are calculated for reconstructing the 3D model. It should be noted that the processes in the steps S106 and S107 may be performed in a parallel manner. Then, in a step S108, the calculation for the texture mapping is carried out in accordance with the above explained equations (4)–(6), and in a next step S109, the 3D model data obtained by this calculation is stored into the memory 57 and auxiliary memory device 51 under the file format of VRML (Virtual Reality Modeling Language) or DXF (Drawing Interchange Format), and is outputted to an external device by means of the data input/output device 52 in a form of a computer data signal embodied in a carrier wave.

As explained above, in the present embodiment, it is sufficient for the user to construct the panoramic image from images picked-up by the image pick-up devices such as the conventional 35 mm still camera and digital camera and to set or denote the characteristic points on the panoramic image. Then, the position of the view point and the positional relationship between the view point and the posts, ceiling and floor within the virtual space are automatically calculated, and the virtual environment, i.e. the inside of the architecture can be produced by utilizing the data in the panoramic image as the texture information. Therefore, it is no more necessary to utilize an expensive distance measuring device such as a range finder as well as plan views of the architecture and 3D coordinates information data such as 3DCAD data. Moreover, it is not necessary to prepare separate texture data. In this manner, according to the invention, the virtual environment can be created by a simple operation by means of the simple and cheap equipment.

Figure 9:
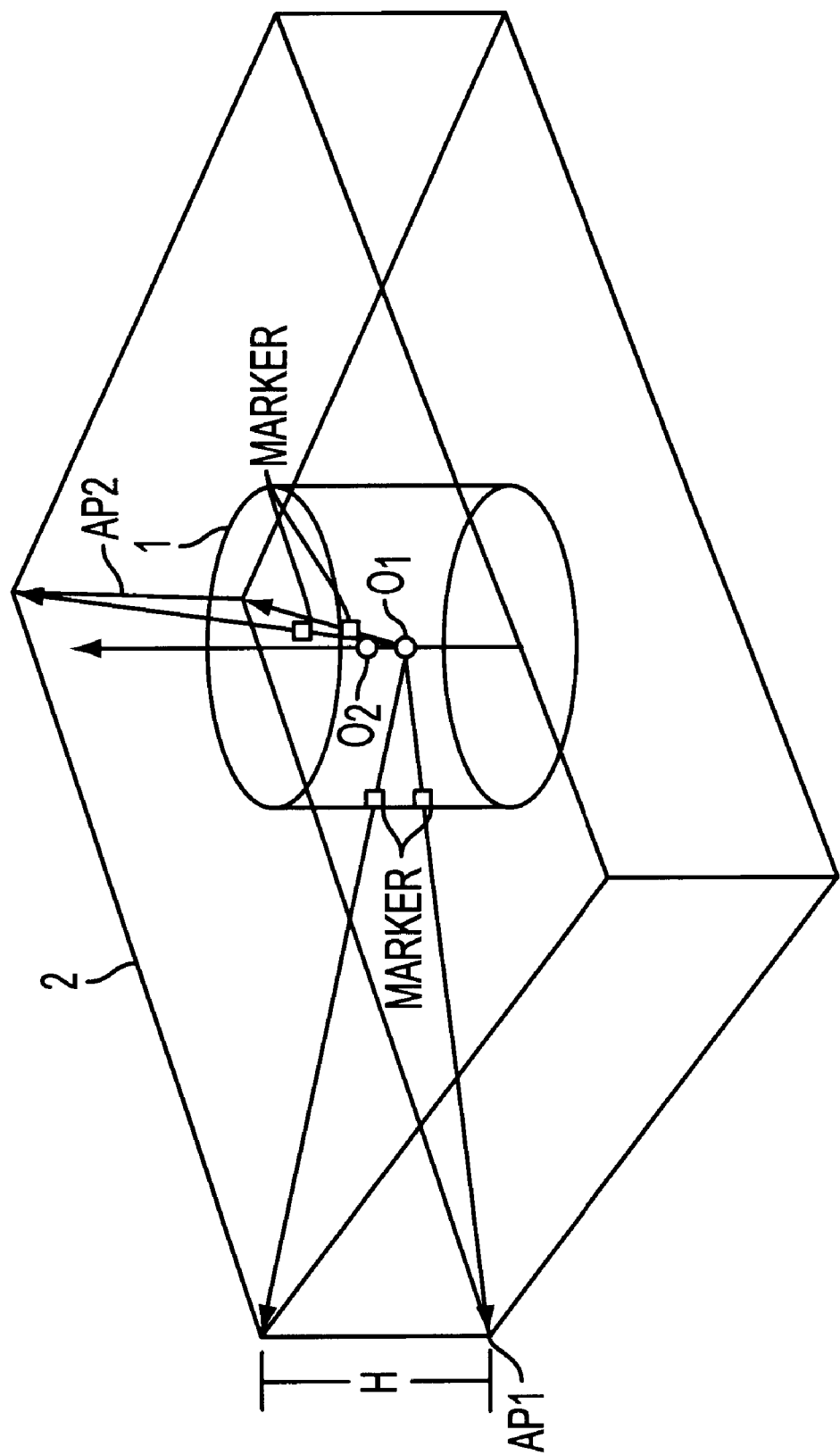
FIG. 9 is a schematic diagram depicting a positional relationship between the panoramic image and the reconstructed 3D model in a second embodiment of the method according to the invention.

Although the panoramic image can be obtained by a special panorama camera, it may be constructed from a plurality of the images picked-up by a conventional 35 mm still camera or a digital camera by utilizing an image combining application software. In either case, an error might occur due to aberrations of lens systems upon being compared with the above explained first embodiment in which the object image is ideally projected on the side wall of the cylindrical body. When coordinates of the view point are calculated from the above mentioned equation (1), if the panoramic image has a deviation or shift from the ideal geometric conversion, a value of w calculated from the vertex AP1 differs from a value of w calculated from the vertex AP2 as depicted in FIG. 9.

Figure 10:
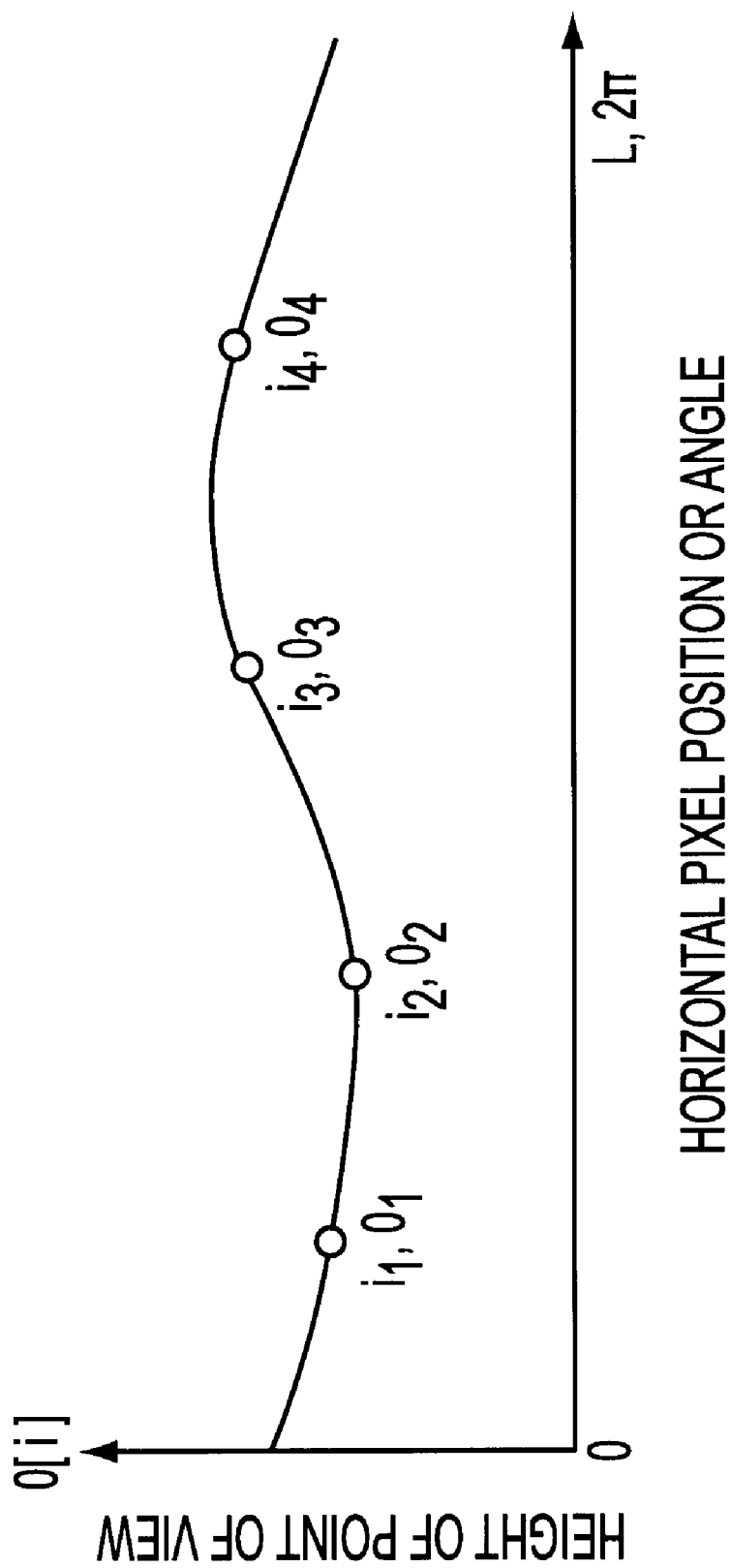
FIG. 10 is a graph showing a variation of the height of a view point in the second embodiment.

In a second embodiment of the virtual environment creating method according to the invention, the virtual environment is created by correcting an error due to the above mentioned deviation of the panoramic image from the ideal geometric conversion. To this end, in the second embodiment, heights of view points $O_1, O_2, O_3, O_4 \ldots$ are calculated for markers set at respective vertices of the 3D model, and these calculated heights are successively connected each other as depicted in FIG. 10. That is to say, a height of a view point in a viewing direction which has not been used for deriving the height of the view point is interpolated on the basis of calculated heights of pints of view between which the relevant view point situates viewed on the horizontal plane, i.e. rotating direction. In this manner, the height of the view point is given as a function O[i], and a height of a view point which has not been used for deriving the height of the view point is derived.

A calculation of a vertical pixel position $j_q$ requires a calculation of the height of the view point when the pixel information of the panoramic image is subtracted in an inverted manner from a relationship between the position P of the 3D model and the position Q of the panoramic image. In this calculation, since $i_p$ can be calculated independently, $j_q[O, i_p, Z]$ can be predominantly determined, wherein Z is a distance from the view point to the 3D model.

Figure 11:
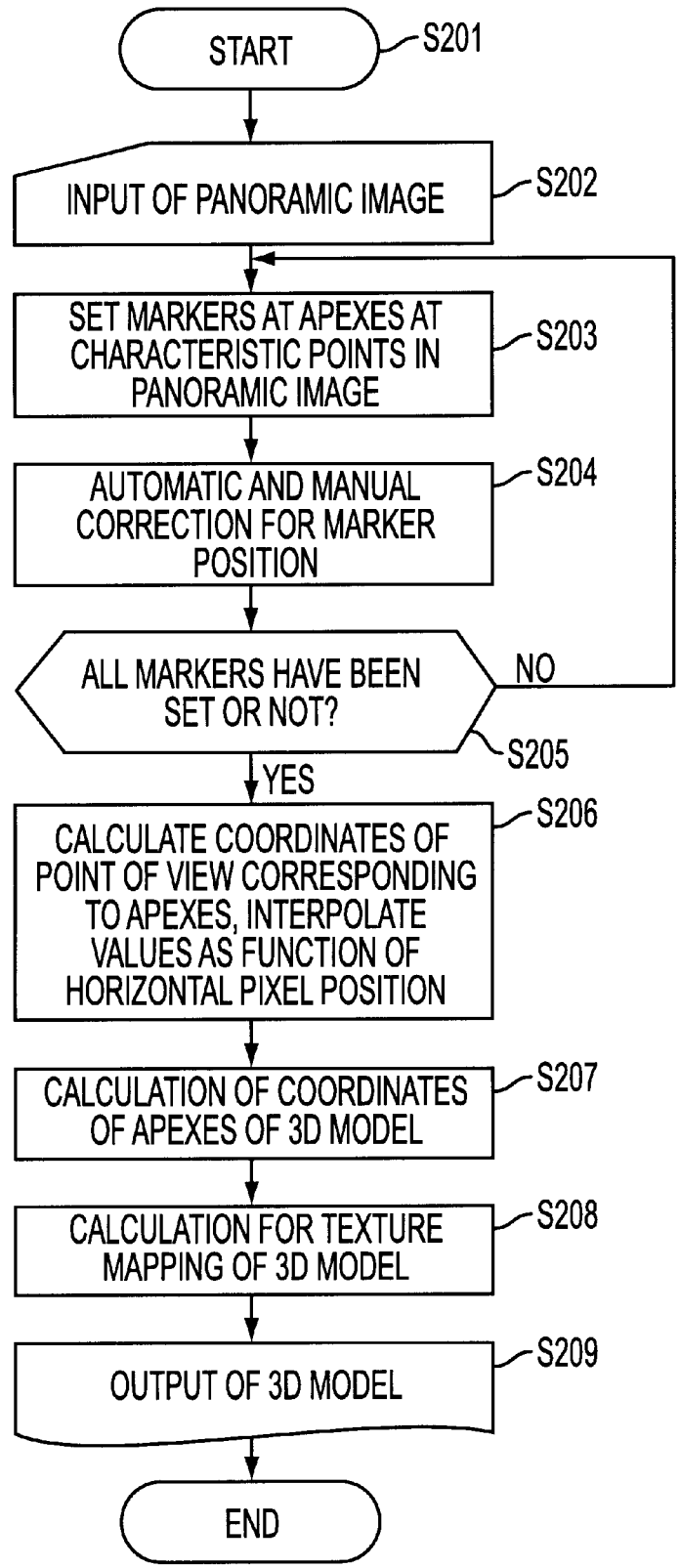
FIG. 11 is a flow chart explaining an operation of the apparatus illustrated in FIG. 7 upon executing the second embodiment of the virtual environment creating method according to the invention.

FIG. 11 is a flow chart explaining operation for performing the second embodiment of the virtual environment creating method according to the invention by means of the apparatus shown in FIG. 7. In FIG. 11, steps S201 to S205 are identical with the steps S101 to S105 shown in FIG. 8. In the present embodiment, when the judgement condition is satisfied in the step S205, coordinates of the view point O is calculated from the marker positions in accordance with the equation (1) are calculated in a step S206, and coordinates of a view point situating between the thus calculated view pointss are interpolated by means of the linear interpolation or spline interpolation. The coordinates of the view point is expressed by the function O[i] of the lateral pixel position of the panoramic image.

Next in a step S207, the coordinates of the vertices on the virtual space $R^3$ are calculated to reconstruct the 3D model like as the step S107. The steps S206 and 207 may be carried out simultaneously. After that, in a step S208, coordinates of the view points are calculated from the function O[i], and the texture mapping is performed in accordance with the equations (4)–(6). In a step S209, the thus obtained 3D model data is stored in the memory 57 and auxiliary memory device 51 and is outputted to the external device via the data input/output device 52 like as the step S109.

In the present embodiment, a height of a view point in a viewing direction in which no post is included can be derived from the function O[i]. Therefore, in addition to the merits of the first embodiment, the virtual environment can be reconstructed in a further accurate manner.

In a third embodiment of the virtual environment creating method according to the invention, when the panoramic image has a distortion aberration, the texture mapping is performed by reducing the distortion aberration in accordance with the actually reconstructed 3D model. That is to say, when the panoramic image is picked-up or constructed, there might be remained the distortion aberration in the vertical direction. This distortion aberration may be deleted by an algorithm for constructing the panoramic image, but if there is only the panoramic image data, one could not know whether or not the distortion aberration is contained in this data.

Figure 12:
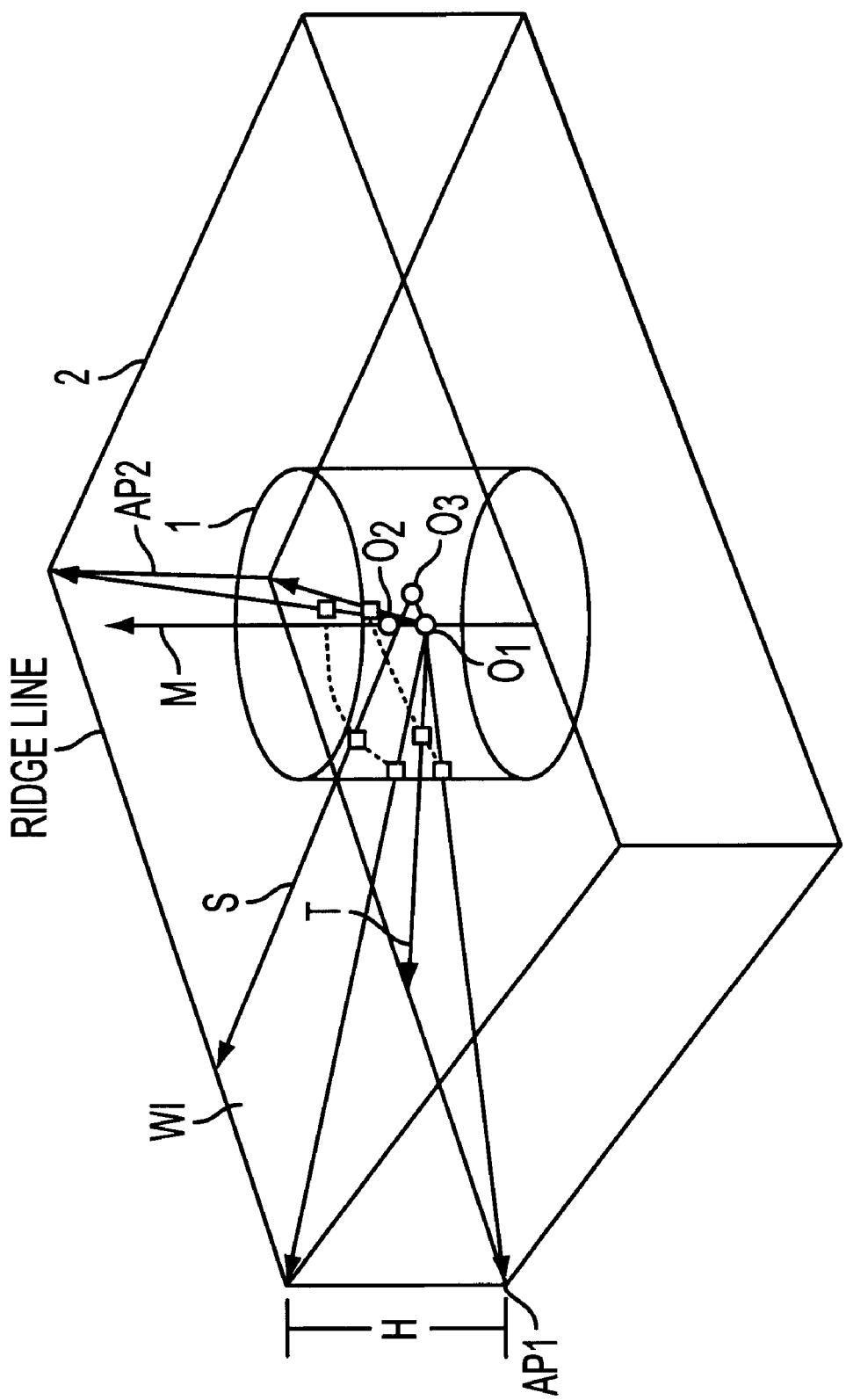
FIG. 12 is a schematic diagram depicting a positional relationship between the panoramic image and the reconstructed 3D image in a third embodiment of the method according to the invention.

In contrast to the above, in the present embodiment, as illustrated in FIG. 12, view points calculated from the vertices AP1 and AP2 are denoted as $O_1$ and $O_2$ like as the second embodiment. Since there is a condition that a curved line connecting the markers corresponding to the vertices of the 3D model corresponds to the side wall SW1 on the panoramic image and the side wall SW1 is rectangular, the height of the side wall SW1 becomes a height H of the panoramic image. Points S and T are selected from the markers S' and T' on the panoramic image, and a position $O_S$ of the view point is calculated under such a condition that a horizontal position is correct. Therefore, the position $O_S$ of the view point deviates from the center axis R of the cylindrical body 1 of the panoramic image owing to the distortion aberration of the panoramic image.

In this manner, the view points calculated from the respective vertices are fixed on the center axis, and therefore the error can be corrected by the variation of the height like as the second embodiment, and at the same time, a view point corresponding to a point on the straight line of the 3D model 2 between the vertices are derived from the restrictive condition for the shape of the 3D model. Therefore, a position of the view point is expressed by a ternary curve with a variable of the horizontal pixel position i, wherein the view point appears on the center axis R of the cylindrical body 1 only when the panoramic image corresponds to respective vertices of the 3D model. In this manner, it is possible to perform the texture mapping of the 3D model with a small inconsistency due to the distortion even if the correction (for instance, extension and shrinkage) for the distortion aberration of the panoramic image is not carried out.

Figure 13:
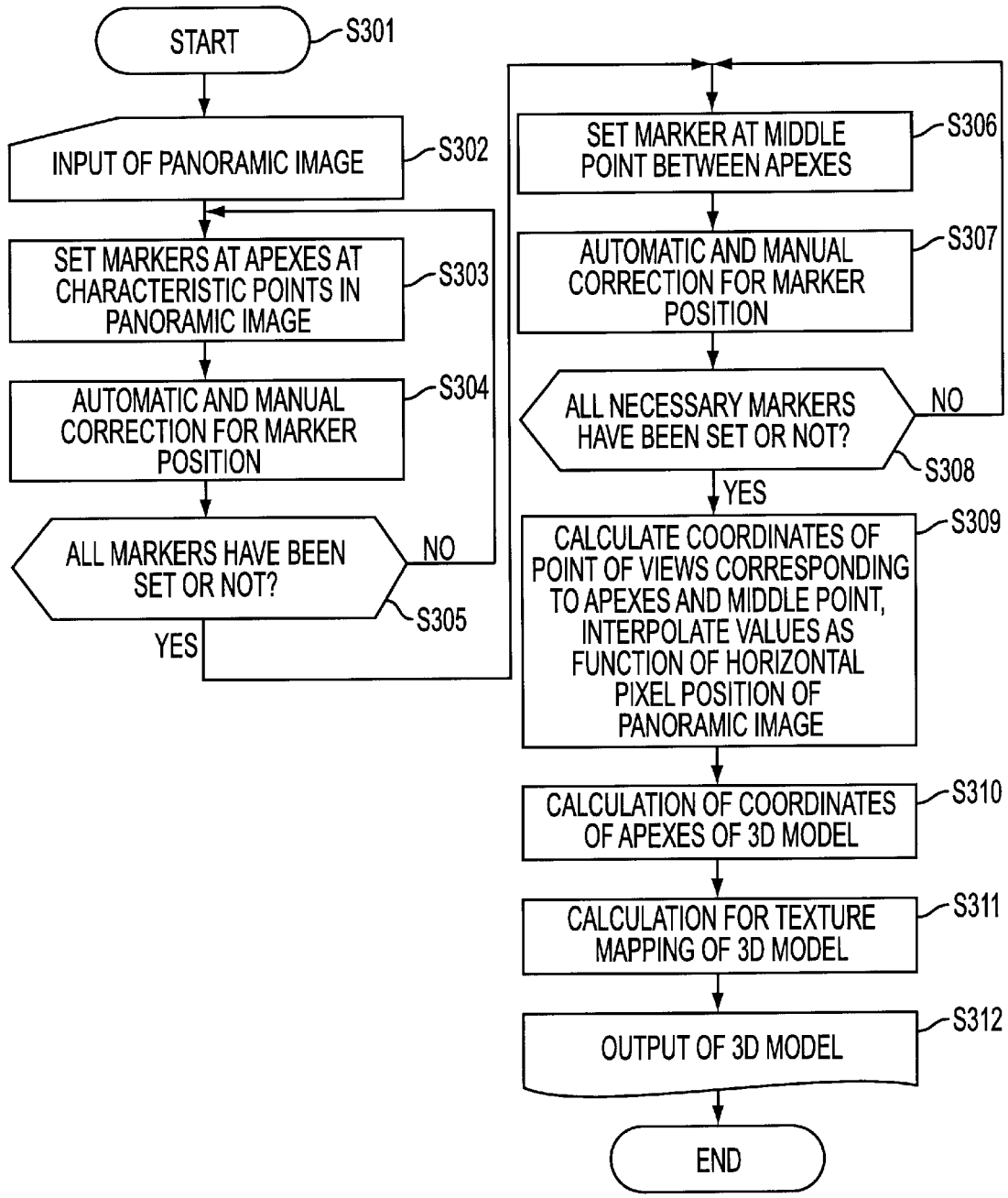
FIG. 13 is a flow chart showing an operation of the apparatus of FIG. 7 upon executing the third embodiment of the virtual environment creating method according to the invention.

FIG. 13 is a flow chart explaining operation for performing the third embodiment of the virtual environment producing method according to the invention by means of the apparatus shown in FIG. 7. In FIG. 13, steps S301 to S305 are identical with the steps S101 to S105 shown in FIG. 8. In the present embodiment, when the judgment condition is satisfied in the step S305, a marker is set at a middle of the markers corresponding to the vertices denoted by the steps S303 to S305. After that, in a step S307, the position of the marker denoted at a middle is automatically and manually corrected like as the step S304. Then, in a step S308, it is judged whether or not markers have been set at all necessary middle positions, and if not, the operation is repeated from the step S306.

If the condition in the step S308 is satisfied, in a next step S309, coordinates of the view points corresponding to the respective vertices of the 3D model are calculated from the marker positions in accordance with the equation (1) are calculated. In the step S309, coordinates of the view points denoted at the middle of the 3D model corresponding to the middle position markers set in the steps S306–S308 are calculated under such a condition that pixel positions of the markers on the panoramic image and the middle points. of the 3D model situate on a straight line connecting the vertices. Then, coordinates of a view point between the thus calculated view points are interpolated by means of the linear interpolation or spline interpolation. The coordinates of the view point is expressed by the ternary function of the lateral pixel position of the panoramic image. Next, in a step S310, coordinates at the vertices on the virtual space $R^3$ are calculated to reconstruct the 3D model like as the step S107.

In a step S311, coordinates of view points are derived from the above mentioned ternary function, and the calculation for the texture mapping is performed in accordance with the equations (4) to (6). The thus obtained 3D model data is stored in the memory 57 and auxiliary memory device 51 and is outputted to the external device via the data input/output device 52.

In the present embodiment, although the horizontal position of the view point deviates during the formation of the panoramic image, the position of the view point is shifted on a horizontal plane in the virtual space on which the view point existent such that a curved beam is corrected into a straight beam. Therefore, in addition to the merits of the second embodiment, the virtual environment can be produced much more accurately.

In the above explained first to third embodiments, the cylindrical body 1 of the panoramic image is arranged such that its upper and lower planes are brought into contact with the ceiling and floor, respectively of the 3D model 2, and the 3D model 2 is reconstructed from the panoramic image while the virtual view point is shifted. In a forth embodiment of the virtual environment producing method according to the invention, the virtual view point is set at the center of the cylindrical body 1 and the height of the 3D model 2 is derived from two markers to reconstruct the 3D model from the panoramic image. Therefore, in the fourth embodiment, the height of the cylindrical body 1 differ from the height of the 3D model 2.

Now it is assumed that a height of the panoramic image is H, a width of the panoramic image measured over 360 degrees is L, an angle of view is $\alpha$, and a radius of the cylindrical body 1 of the panoramic image is r. Furthermore, the panoramic image is picked-up by a fish-eye lens under such a condition that perspective does not tilt. Then, the height H of the panoramic image is given by the following equation (7).

$$H = 2r \sin \alpha/2 \qquad (7)$$

Moreover, since the panoramic image covers a whole circumference of 360 degrees, $L = 2\pi r$. Therefore, when L is known, it is possible to calculate the viewing angle $\alpha$. In the present embodiment, since the view point is set on the center of the image, a position of the view point in the panoramic image becomes H/2.

Figure 14A:
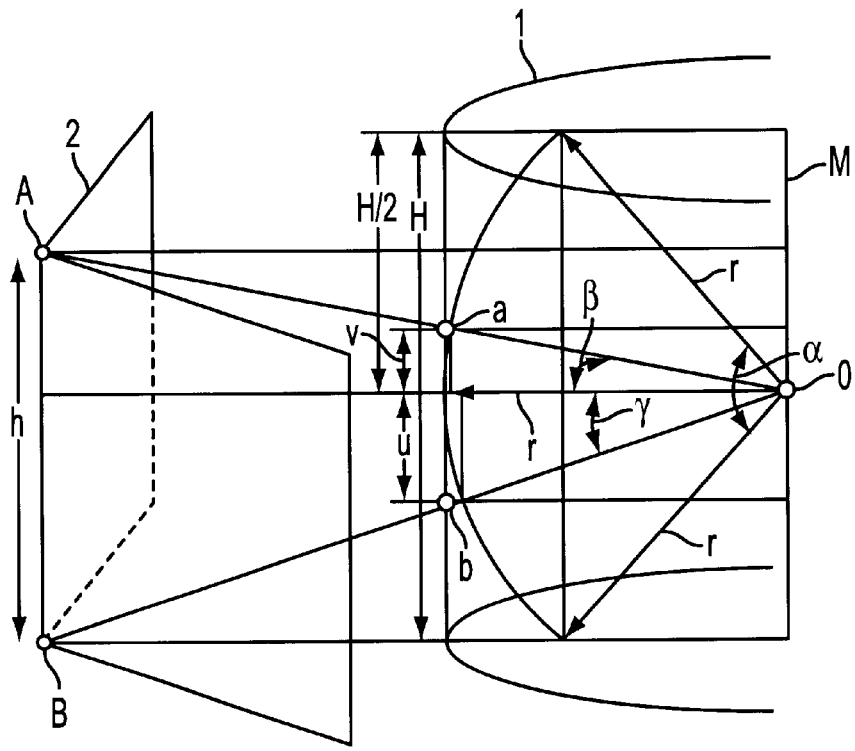
FIGS. 14a and 14b are schematic diagram depicting a fourth embodiment of the virtual environment creating method according to the invention.

In FIG. 14(a), vertical pixel positions on the panoramic image of the markers corresponding to the vertices of the ceiling A and floor B within the 3D model 2 are expressed by a and b, respectively. Then, azimuth angles $\beta$ and $\gamma$ viewing the point a and b from the view point O can be expressed by the following equation (8).

$$\left.\begin{array}{l}\sin\beta = \dfrac{H/2 - a}{r} > 0 \\ \sin\gamma = \dfrac{b - H/2}{r} > 0\end{array}\right\} \quad (8)$$

Now we define that $u = \max(H/2-a, b-H/2)$ $v = \min(H/2-a, b-H/2)$ \hfill (9)

Then, the following relationship can be obtained.

$$\dfrac{u}{(r^2 - u^2)^{1/2}} = \dfrac{H/2}{Z} \quad (10)$$

In this manner, a distance from the pint of view O to the wall surface of the 3D model can be derived. A point corresponding to the other marker may be derived by the following equation (11) under such a condition that this point is also separated from the center line M of the cylindrical body 1 by the same distance.

$$\dfrac{h - H/2}{Z} = \dfrac{v}{(r^2 - v^2)^{1/2}} \quad (11)$$

wherein h is a height of the 3D model 2. In this manner, the height h of the 3D model 2 can be derived. It should be noted that in the case of FIG. 14(*a*), u=b−H/2 and v=H/2−a.

Figure 14B:
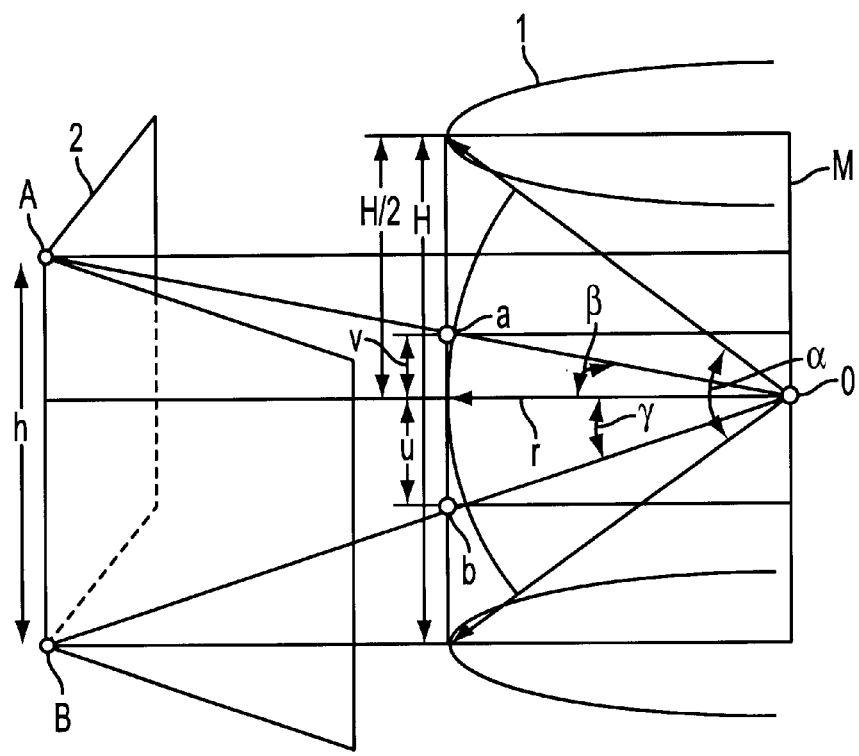

FIG. 14(*b*) represents a relationship between the panoramic image (cylindrical image) and the reconstructed 3D model when the imaging lens has no distortion. In this case, the panoramic image has a height H and an angle of view α.

$H = 2r \cdot \tan \alpha/2$ \hfill (7')

Here, a distance Z from the view point O to the line AB may be given by the following equation (10'), by using u, v obtained from the positional relationship between the markers a, b and the view point O like as the equation (9).

$$\dfrac{u}{r} = \dfrac{H/2}{Z} \quad (10')$$

The u and v in FIG. 14(*b*) may be given by the same way as FIG. 14(*a*). Here, in order to derive the height h of the model, the following equation (11') similar to the equation (11) is utilized.

$$\dfrac{h - H/2}{Z} = \dfrac{v}{r} \quad (11')$$

In the texture mapping to be explained later, the height h and distance Z of the respective models may be used for the case of the fish-eye lens and for the case of the lens free from the distortion.

Figure 15:
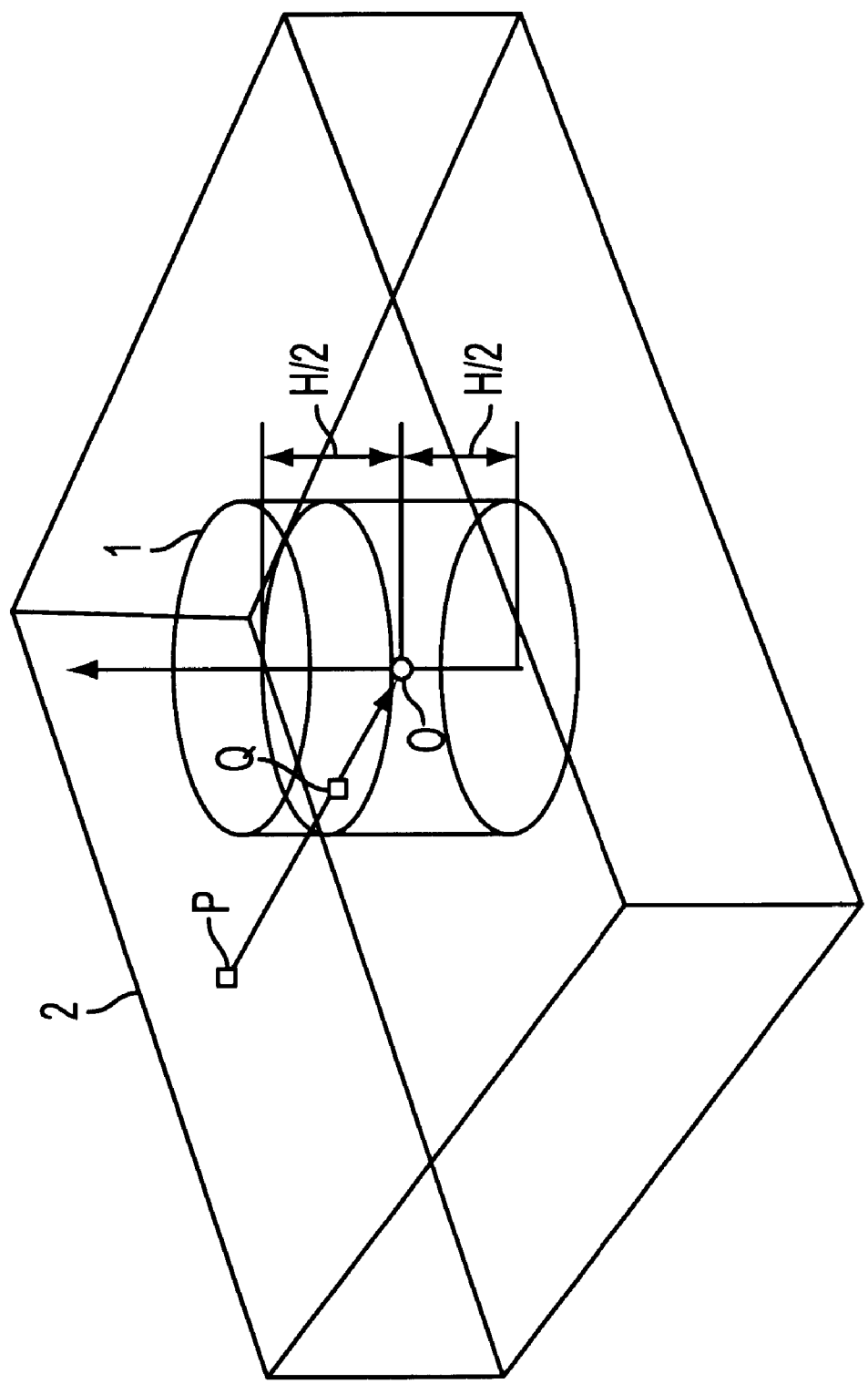
FIG. 15 is a schematic diagram explaining the texture mapping of the 3D model in a fourth embodiment of the virtual environment creating method according to the invention.

In the texture mapping for the 3D model 2, pixel information of a point Q on the cylindrical body 1 of the panoramic image is mapped to a point P as shown in FIG. 15, said point P being a cross point between the 3D model 2 and a straight line connecting said point Q to the view point O. Now an example of an algorithm for performing the mapping of pixels will be explained hereinbelow.

In this embodiment, since a relationship between a pixel position $(i_p, j_q)$ of the panoramic image corresponding to the array (p, q) of the image of the wall and a horizontal pixel position is similar to that shown in FIG. 4, the pixel position of the panoramic image corresponding to (p, q) may be derived from the following equation (12).

$$i_p = \dfrac{(\theta_1 - \theta_p) \cdot L}{2} + i_1, \quad Z_p = \dfrac{Zc}{\cos\theta_p} \quad (12)$$

wherein $$\theta_p = \tan^{-1}\left(\dfrac{Zc \tan\theta_1 - p}{Zc}\right)$$

From the positional relationship between the view point and the side wall, (Zc tan $\theta_1$−p/Zc) is guaranteed to be within ±90°.

Figure 16:
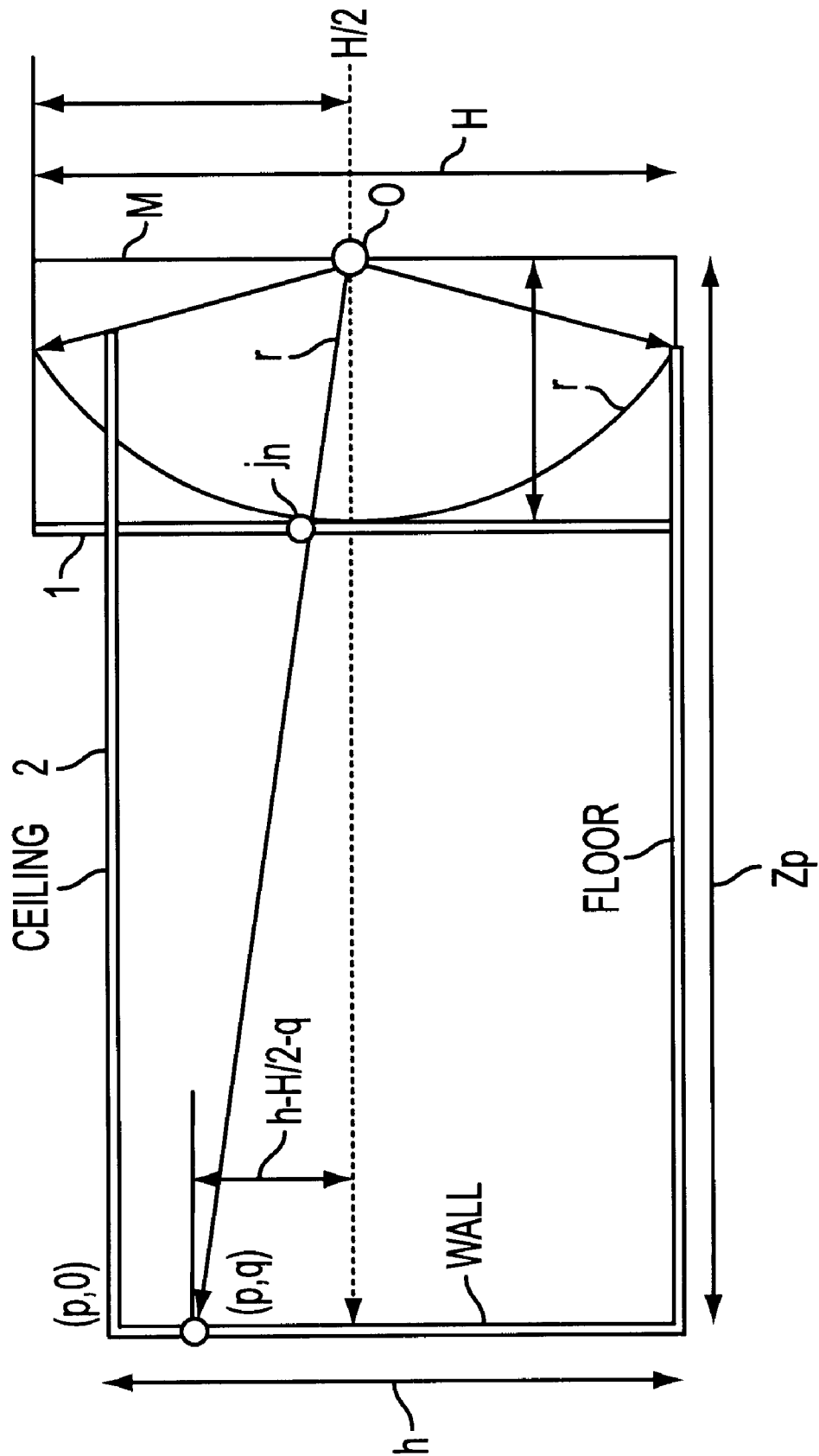
FIG. 16 is a schematic cross sectional view showing the texture mapping for a wall in the fourth embodiment, when a view point is closer to a ceiling.
Figure 17:
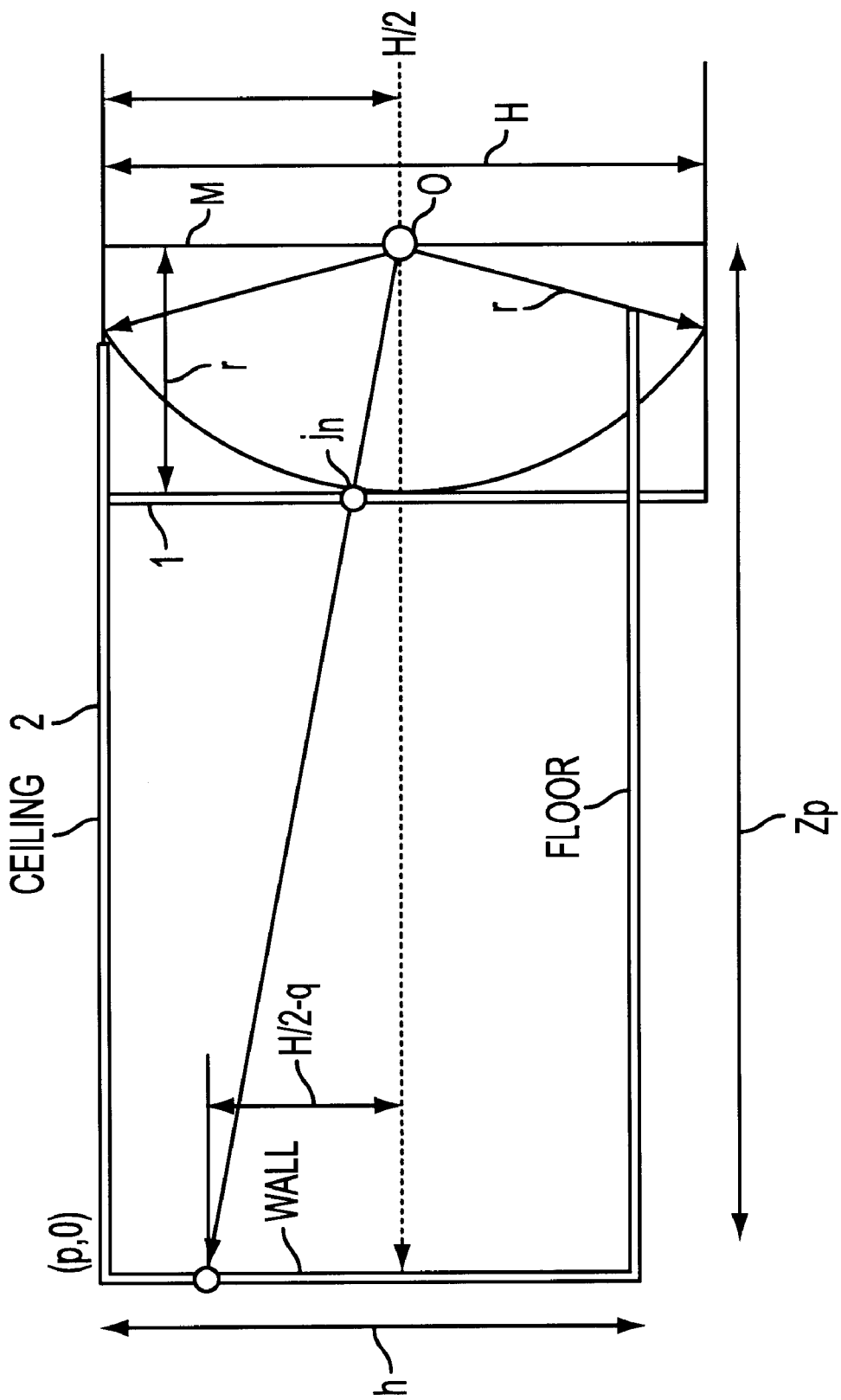
FIG. 17 is a schematic diagram illustrating, in cross section, the texture mapping for the wall when a view point is closer to a floor.

By taking the array of the image of the wall having the height h of the 3D model 2 as a reference, when the view point O is closer to the ceiling than to the floor, a height of the ceiling viewed from the view point O becomes h-H/2 as shown in FIG. 16. In contrast, when the view point O is closer to the floor than to the ceiling, a height of the ceiling viewed from the view point O becomes H/2 as illustrated in FIG. 17. In the former case, the following equation (13) is obtained.

$$\dfrac{(h - H/2 - q)}{\{Z_p^2 + (h - H/2 - q)^2\}^{1/2}} = \dfrac{H/2 - j_q}{r} \quad (13)$$

From this equation (13), the following equation (14) may be derived.

$$j_q = H/2 - \dfrac{r \cdot (h - H/2 - q)}{\{Z_p^2 + (h - H/2 - q)^2\}^{1/2}} \quad (14)$$

In this manner, the texture mapping for the wall is performed by mapping the pixel information from the array $(i_p, j_p)$ of the panoramic image to texture image (p, q).

Figure 18:
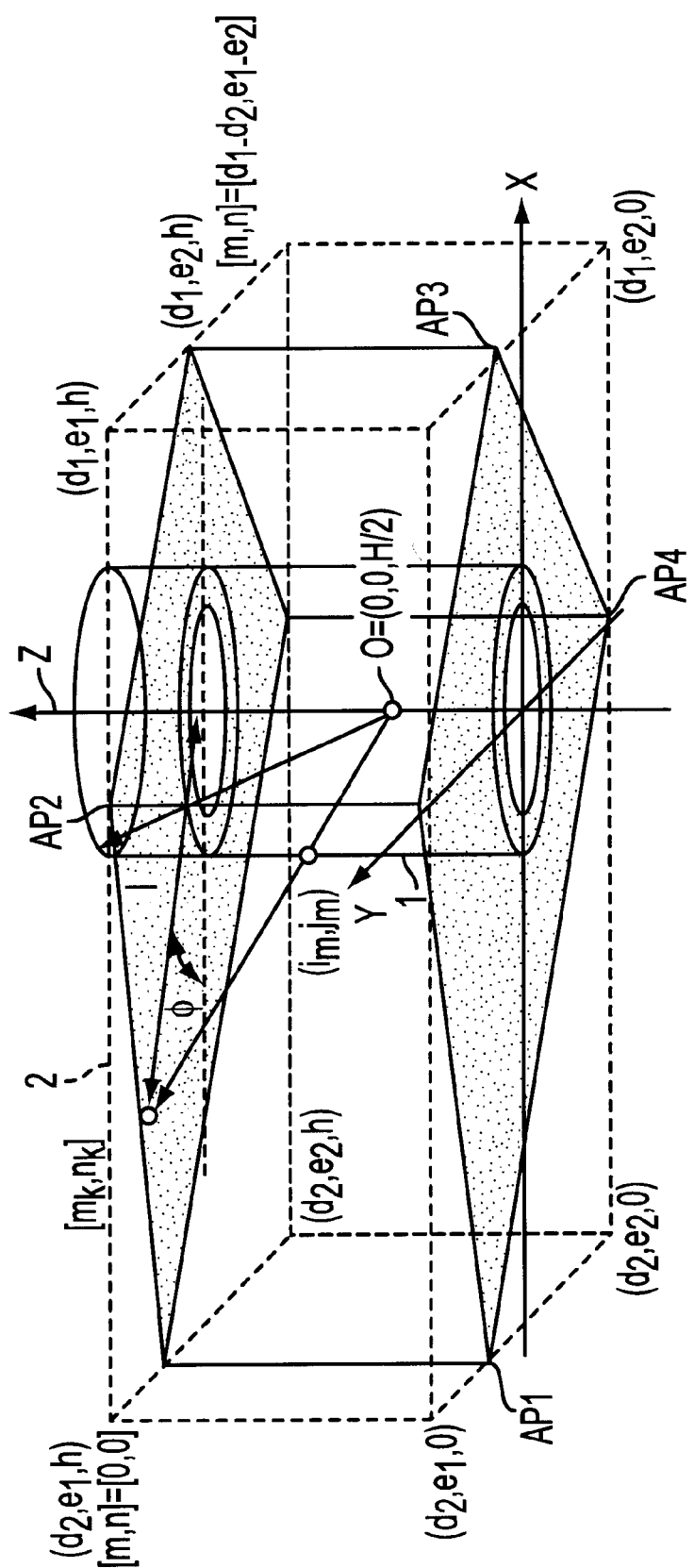
FIG. 18 is a schematic diagram explaining the texture mapping for the ceiling and floor when a view point is closer to the ceiling.

FIG. 18 shows the texture mapping for the ceiling and floor. It should be noted that the texture mapping for the ceiling and floor may be performed in the same manner as that of the first embodiment. It is assumed that indexes of horizontal positions of markers of the panoramic image corresponding to vertices AP1, AP2, AP3 and AP4 of the 3D model are denoted by $i_1, i_2, i_3$ and $i_4$, horizontal angles when the left hand end of the panoramic image is set to zero $\theta_1$, $\theta_2$, $\theta_3$ and $\theta_4$, array of the ceiling and floor images [m, n], and x, y coordinates when the view point O is set to the origin are denoted by (d, e). Then, pixel positions of the panoramic image corresponding to [m, n] are calculated. In this case, the height of the view point is H/2 and the height of the room of the 3D model is h.

Now successive steps of the texture mapping for points on the ceiling will be explained. In a coordinate system for the array [m, n] while the view point O is set to the origin, a distance l from the origin may be given by the following equation (15).

$$l = \{(-d_2 - m_k)^2 + (e_1 - n_k)^2\}^{1/2} \quad (15)$$

Then a rotation angle φ is expressed by the following equation (16) when the left hand end is taken as an origin.

$$\phi = \tan^{-1}\left(\frac{e_1 - n}{d_2 - m}\right) \qquad (16)$$

In this case, a horizontal pixel position of the panoramic image (cylindrical body) $i_m$ may be represented as follows.

$$i_m = \frac{\phi \cdot L}{2\pi} \qquad (17)$$

Figure 19:
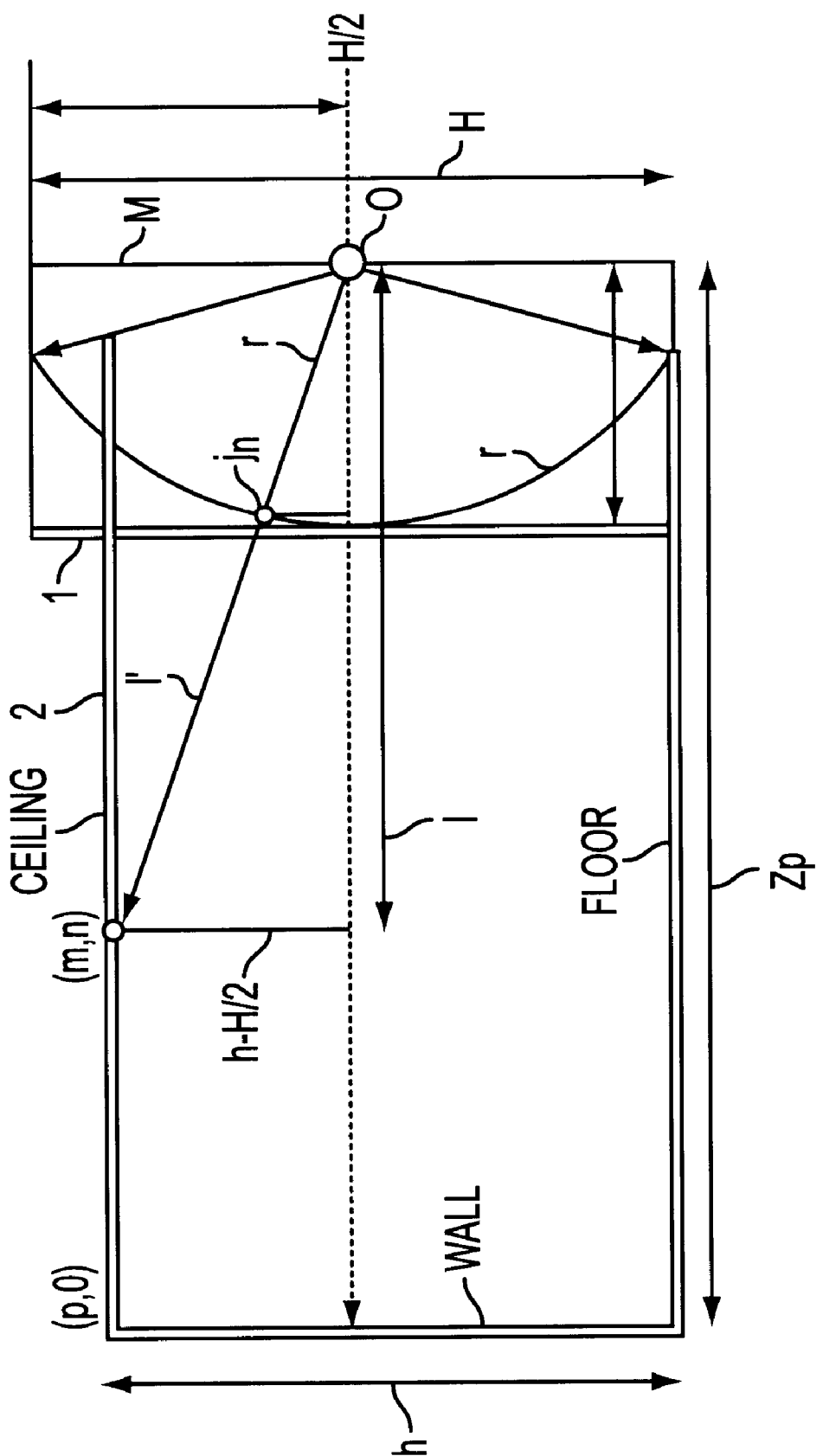
FIG. 19 is a schematic cross sectional view depicting in greater detail the texture mapping for the ceiling when a view point is closer to the ceiling.
Figure 20:
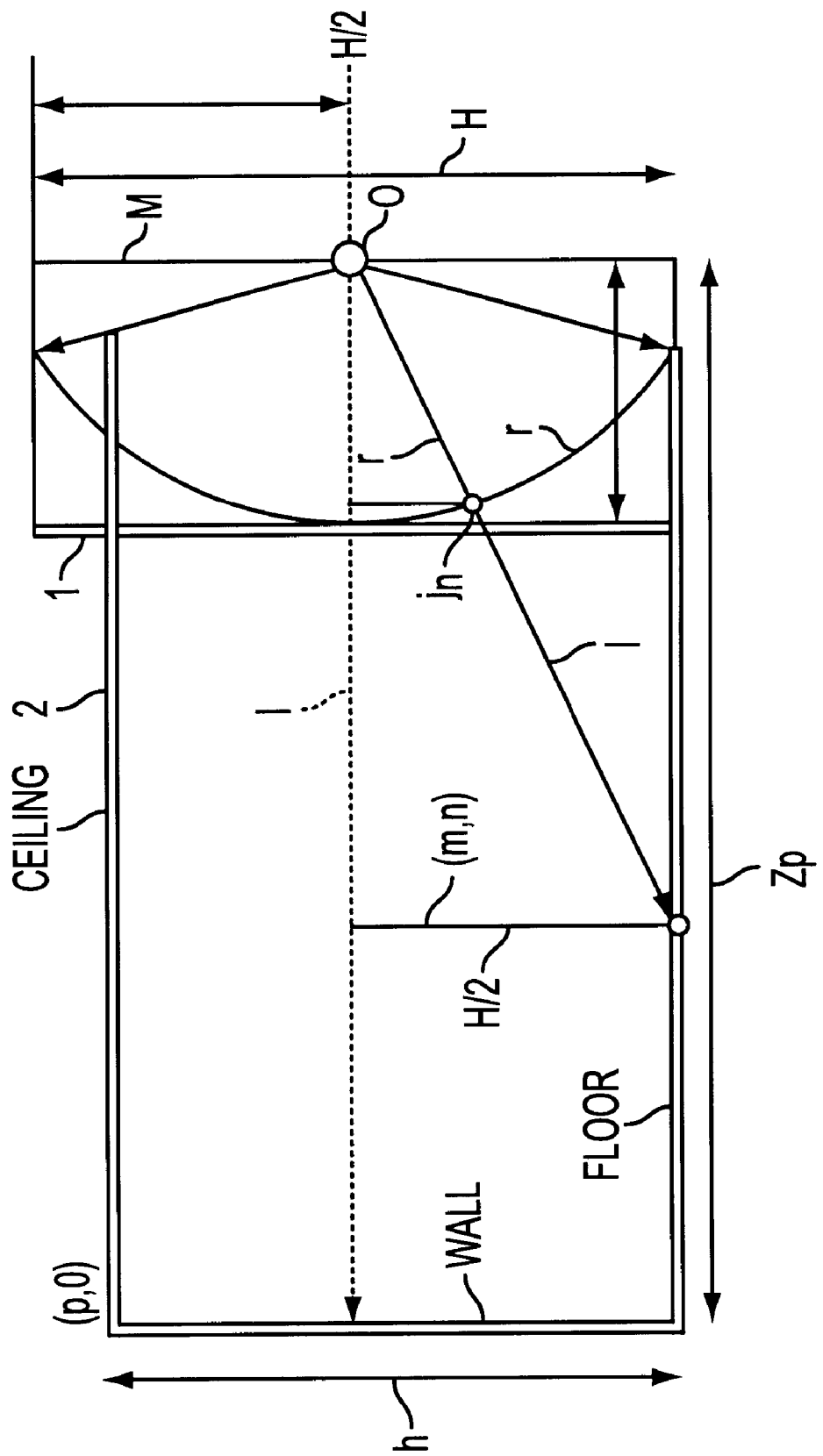
FIG. 20 is a schematic cross sectional view explaining in greater detail the texture mapping for the floor when a view point is closer to the ceiling.

Contrary to this, a vertical pixel position $j_n$ of the panoramic image corresponding to [m, n] is dependent upon a fact that the vertical position of the view point is closer to the ceiling or floor of the 3D model 2. FIGS. 19 and 20 show the case in which the view point O is closer to the ceiling. As depicted in FIG. 19, a distance from a point [m, n] on the ceiling to the center line M of the cylindrical body 1 is denoted by 1. Since a distance from the pint of view O to the ceiling is equal to h-H/2, a distance l' between the view point O and the point [m, n] may be expressed by the following equation (18).

$$l' = \{l^2 + (h - H/2)^2\}^{1/2} \qquad (18)$$

Therefore, when it is assumed that a distance in from the upper edge of the panoramic image to a cross point between a straight line connecting the point [m, n] and the view point O each other and a spherical surface having a radius r, this distance $j_n$ may be expressed by the following equation (19).

$$j_n = H/2 - \frac{r(h - H/2)}{l'} \qquad (19)$$

In the texture mapping for the floor, as illustrated in FIG. 20, a distance l' from a point [m, n] on the floor to the view point O and a pixel position in the vertical direction of the panoramic image corresponding to the point [m, n] may be derived from the following equations (20).

$$\left.\begin{array}{l} l' = \{l^2 + (H/2)^2\}^{1/2} \\ j_n = H/2\left(l + \frac{r}{l'}\right) \end{array}\right\} \qquad (20)$$

Similarly, when the view point O is closer to the floor, for the texture mapping for the ceiling, a vertical pixel position $j_n$ of the panoramic image corresponding to a point [m, n] on the ceiling may be expressed by the following equation (21).

$$j_n = H/2(l - \tfrac{r}{l'}) \qquad (21)$$

Therefore, for the texture mapping for the floor, a vertical pixel position $j_n$ of the panoramic image corresponding to the point [m, n] on the floor may be expressed by the following equation (22).

$$j_n = H/2 + \frac{r(h - H/2)}{l'} \qquad (22)$$

In this manner, in the present embodiment, after setting the markers on the displayed panoramic image by means of the user interface, the virtual view point is set at a center of the cylindrical body 1 of the panoramic image, the height h of the 3D model 2 is calculated from the two markers in accordance with the equations (7)–(11). Then, coordinates of the vertices are calculated on the basis of the height h of the 3D model, and furthermore the calculating process for the texture mapping of the 3D model is performed. In this manner, the 3D model 2 can be reconstructed from the panoramic image. The remaining processes in the present embodiment are identical with those of the first embodiment.

In the present embodiment, the texture mapping is carried out by considering the angle of view of the panoramic image, and therefore the virtual environment having a small distortion can be obtained from a panoramic image having a large angle of view.

Figure 21:
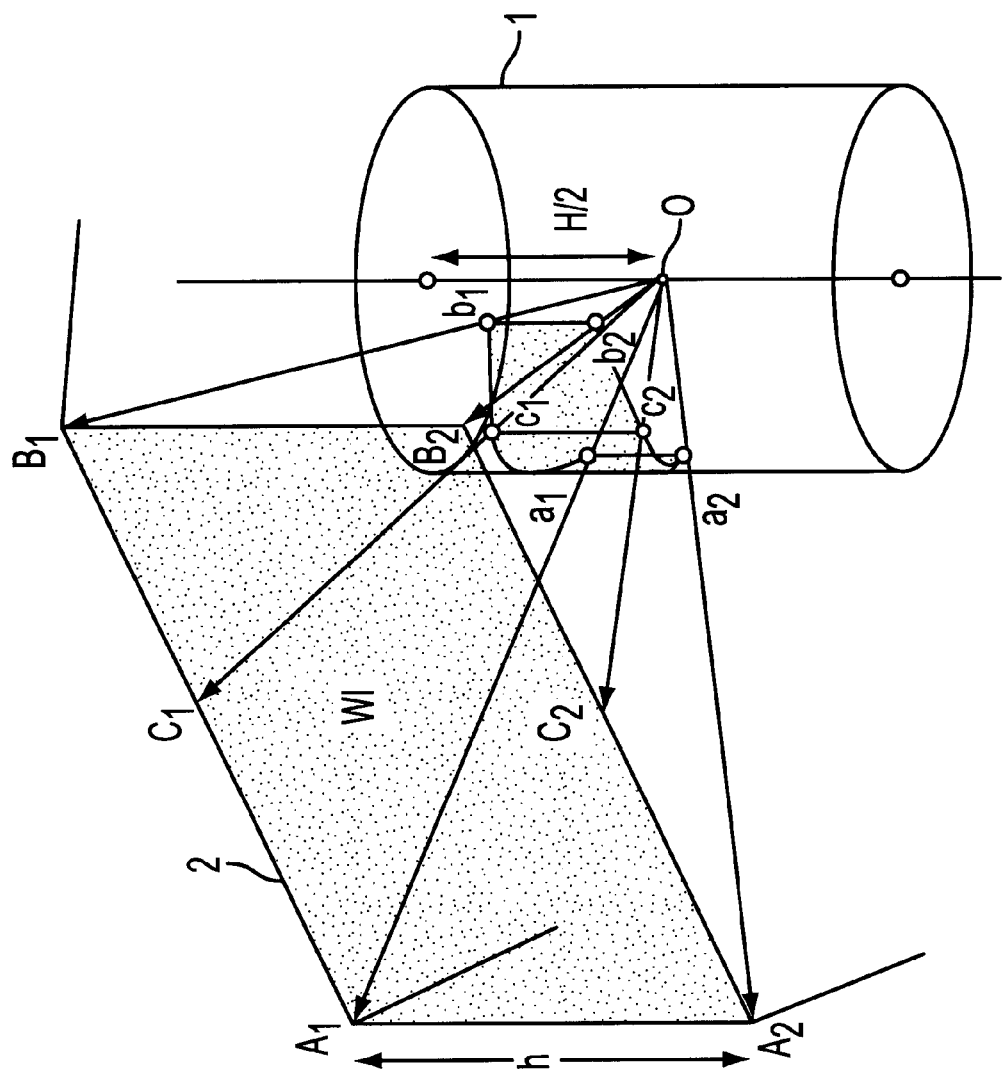
FIG. 21 is a schematic diagram showing a fifth embodiment of the virtual environment creating method according to the invention.

In a fifth embodiment of the virtual environment creating method according to the invention, an error about the distance related to the view point O is corrected under a restriction condition that a height of the room of the 3D model is constant and a beam connecting the corners is straight in the fourth embodiment. As shown in FIG. 21, on a wall plane W1 surrounded by vertices $A_1$, $A_2$, $B_1$, $B_2$ of adjacent corners of the 3D model 2, middle points $C_1$ and $C_2$ are denoted by means of the user interface. Then, an error in the distance related to the view point O is corrected upon the reconstruction of the 3D model 2 under such a condition that points $A_1$, $C_1$, $B_1$ and points $A_2$, $C_2$, $B_2$ are positioned on straight lines, respectively and distances $A_1$–$A_2$, $B_1$–$B_2$, $C_1$–$C_2$ are equal to the height h of the room of the 3D model.

At first, from positions of markers $a_1$ and $a_2$ on the panoramic image corresponding to the vertices $A_1$ and $A_2$, a distance Za from the markers to the model and the height h of the room are derived like as the fourth embodiment. Then, actual distances from the markers $b_1$ and $b_2$ to the model are derived. Since the height h of the room has been determined by this time, a distance Zb from the center M of the cylindrical body 1 to the vertex $B_1$ is calculated from the positions of the marker $b_1$ and view point O in accordance with the following equation (23).

$$Zb = \frac{(H/2 - b_1)}{\{r^2 - (H/2 - b_1)^2\}^{1/2}}(h - H/2) \qquad (23)$$

Figure 22:
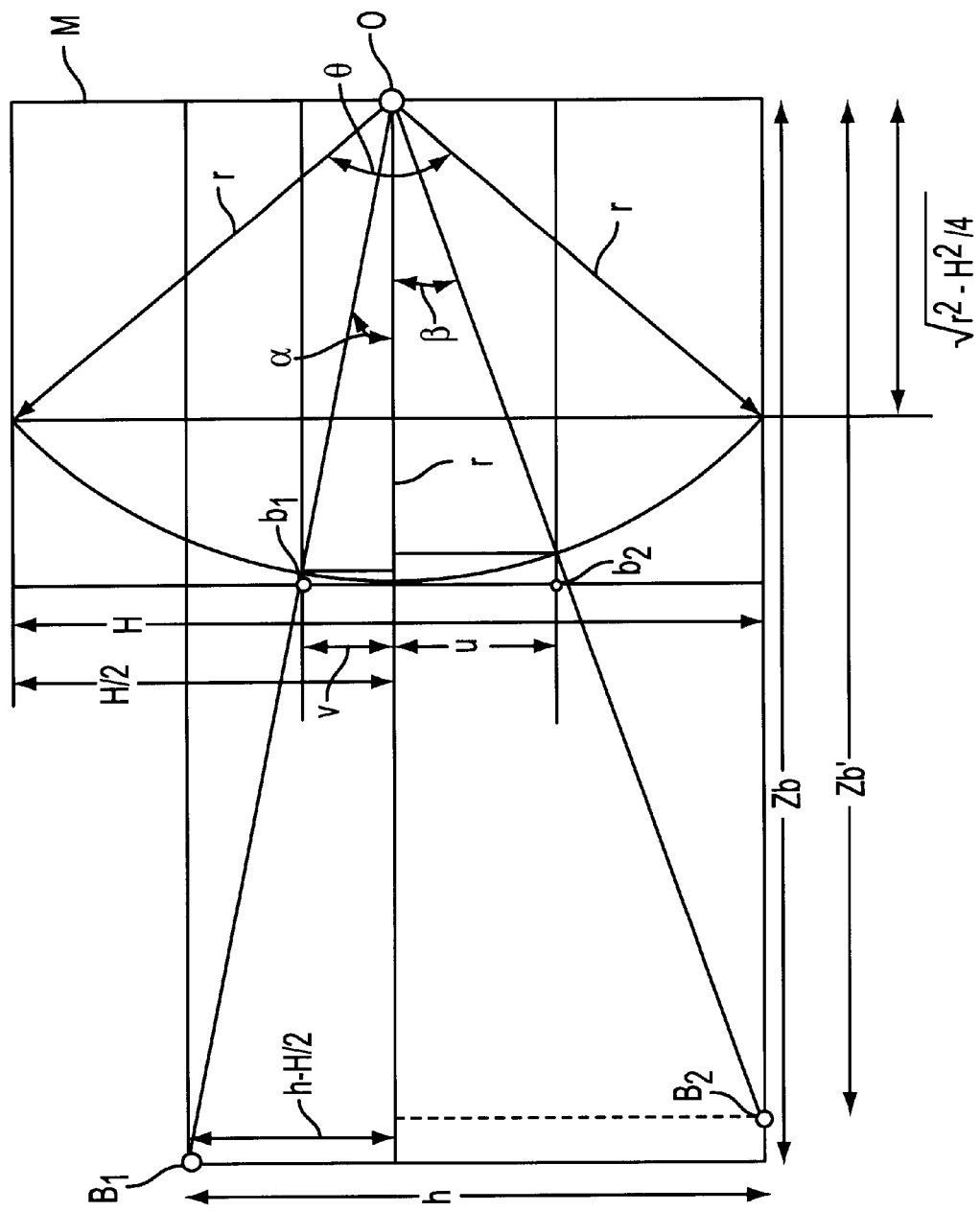
FIG. 22 is a schematic diagram illustrating a positional relationship between a cylindrical body of a panoramic image and a distance from a center of the cylindrical body to vertices $B_1$ and $B_2$ of the 3D model in the fifth embodiment.

It should be noted that FIG. 22 shows the case in which the view point O is closer to the ceiling.

Similarly, a distance Zb' from the center line M of the cylindrical body 1 to the vertex $B_2$ is calculated from the positions of the marker $b_2$ and view point O in accordance with the following equation (24).

$$Zb' = \frac{(b_2 - H/2)}{\{r^2 - (H/2 - b_2)^2\}^{1/2}}(H/2) \qquad (24)$$

If Zb' is not equal to Zb, we assume that the distance Zb is always correct in the 3D model 2, and a value of Zb' should be corrected to a value of Zb. In this manner, any inconsistency between the texture mapping and the shape of the 3D model 2 can be removed.

To this end, a distance from a point at which an arc representing the angle of view θ is brought into contact with the floor to the center line M of the cylindrical body 1 is expressed by the following equation (25) in any direction.

$$Z = (r^2 - H^2/4)^{1/2} \qquad (25)$$

In this manner, the actual texture of the panoramic image becomes at a point separated from the view point O by the distance Zb by defining a correction coefficient $f_b$ in the following manner.

$$z + f_b(Zb' - z) = Zb$$

or $$Zb' = \frac{-z + Zb}{f_b} + z \quad (26)$$

The above explained correction is conducted while the height H/2 of the view point O is taken as a boundary.

Figure 23:
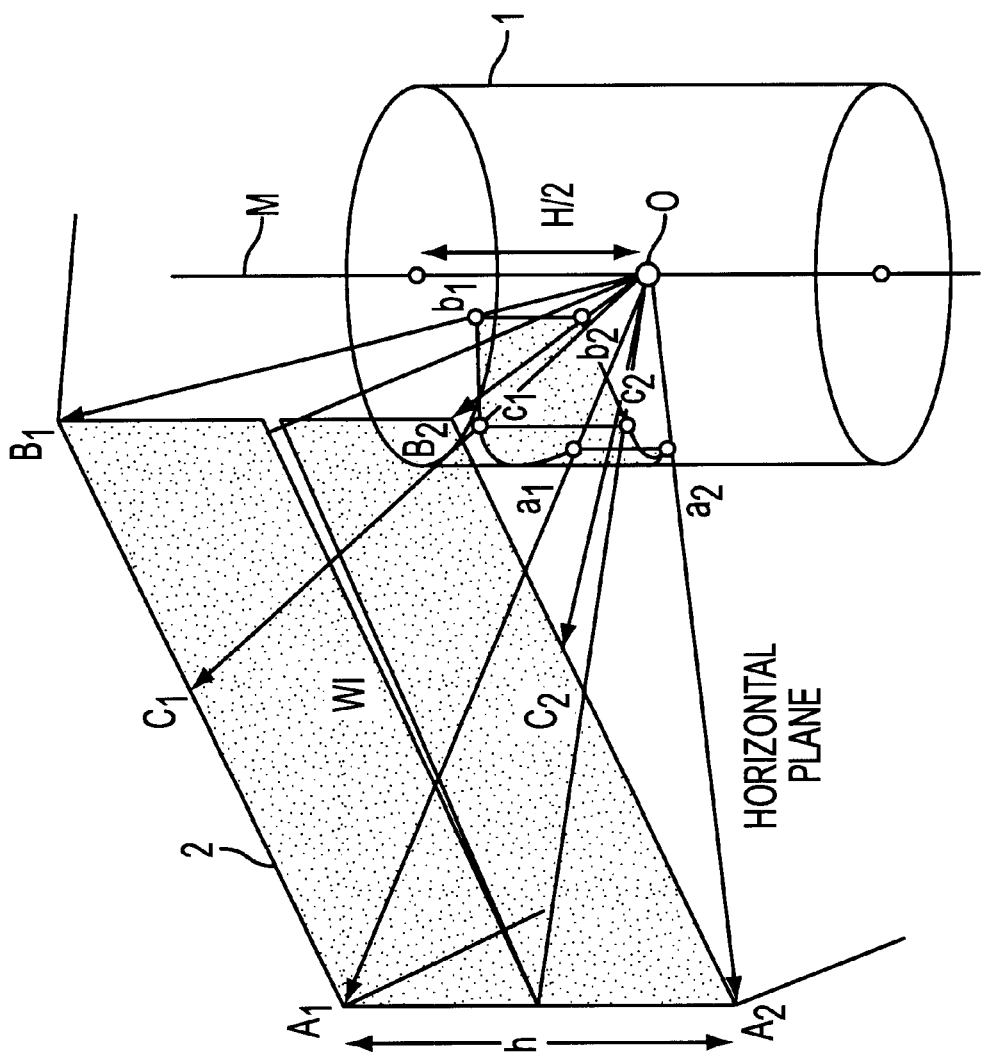
FIG. 23 is a schematic diagram showing an example of an error in a distance from a view point of the 3D model to the vertices in the fifth embodiment.

FIG. 23 shows a condition in which an error is introduced in the distance to the model calculated from the marker $b_2$ in accordance with the vertices $A_1$, $A_2$ and $B_1$ of the 3D model 2. Since the wall W1 ($A_1$, $A_2$, $B_2$, $B_1$) of the 3D model 2 should situate on the same plane, in order to correct the error shown in FIG. 23, in the texture mapping for a lower portion of the wall than the horizontal plane, said enlargement factor f is given as a function of the horizontal pixel position of the panoramic image. Now it is assumed that the horizontal pixel position of the markers $a_1$, $a_2$ is denoted as $I_a$ and the horizontal pixel position of the markers $b_1$, $b_2$ is expressed as $I_b$. Then, the correction coefficient f may be expressed by the following equation (27).

$$f(i_a) = 1$$
$$f(i_b) = f_b \quad (27)$$

It should be noted that in FIG. 23, the correction coefficient f is set such that the horizontal pixel position is linearly interpolated, but it may be set as a function f(p) of the pixel array (p, q) of the wall plane W1.

The distance between the view point O and the wall W1 of the 3D model 2 calculated from the marker $a_1$ and $b_1$ may be given as Zp which is a function of p from the pixel position (p, q) on the wall W1 in accordance with the above mentioned equation (12). In this manner, a vertical position $j_q$ may be obtained by placing the equations (13) and (14) into the equation (26) in the following manner.

$$\frac{(h - H/2 - q)}{\left\{\left(\frac{-z + Zp}{f(i)} + z\right)^2 + (h - H/2 - q)^2\right\}^{1/2}} = \frac{H/2 - j_q}{r} \quad (28)$$

$$\Rightarrow j_q = H/2 - \frac{r \cdot (h - H/2 - q)}{\left\{\left(\frac{-z + Zp}{f(i)} + z\right)^2 + (h - H/2 - q)^2\right\}^{1/2}}$$

$$\frac{(H/2 - q)}{\left\{\left(\frac{-z + Zp}{f(i)} + z\right)^2 + (H/2 - q)^2\right\}^{1/2}} = \frac{H/2 - j_q}{r} \quad (29)$$

$$\Rightarrow j_q = H/2 - \frac{r \cdot (H/2 - q)}{\left\{\left(\frac{-z + Zp}{f(i)} + z\right)^2 + (H/2 - q)^2\right\}^{1/2}}$$

Thus the error as shown in FIG. 23 is corrected. The texture-mapping of the image information of the thus derived pixel position ($i_p$, $j_q$) of the panoramic image onto a pixel position (p, q) on the wall W1 is performed to construct the wall of the 3D model 2.

In FIG. 23, if there is not produced any error in the texture mapping for a region above the view point O, it is sufficient to consider the correction of the texture mapping only for the floor surface. In this case, when it is assumed that a distance between a point denoted by the array [m, n] on the floor surface and the center line M of the cylindrical body is denoted by l, a correction value $l_2$ may be given by the following equation (30).

$$l_2 = \frac{(l - z)}{f(i)} + z \quad (30)$$

Then, like as the above mentioned equation (20), the following relationship can be obtained.

$$l'_2 = \{l_2^2 + (H/2)^2\}^{1/2}$$
$$j_n = H/2\left(l + \frac{r}{l'_2}\right) \quad (31)$$

Figure 24:
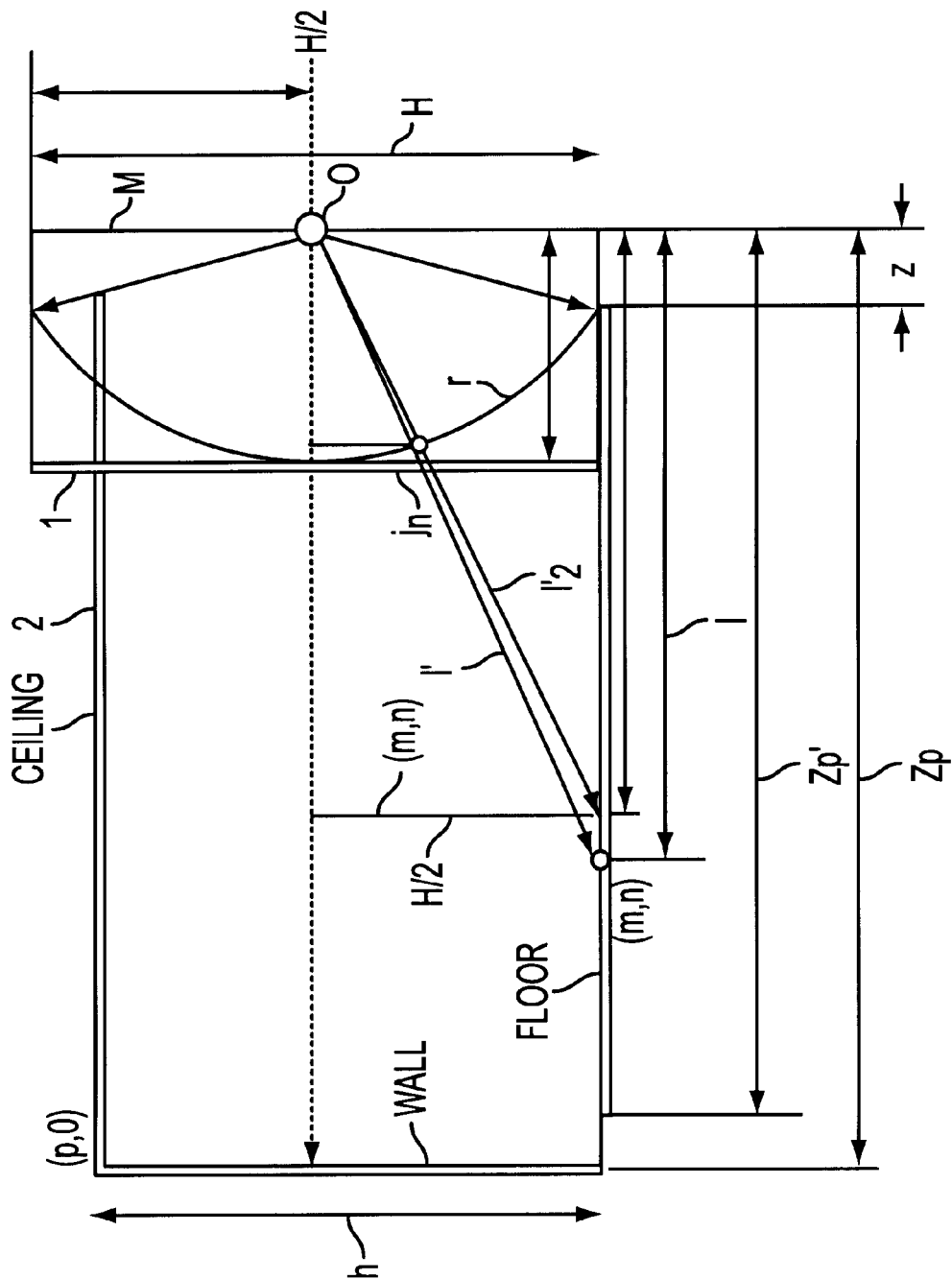
FIG. 24 is a schematic diagram illustrating, in cross section, a texture mapping for a floor in the fifth embodiment.

That is to say, as illustrated in FIG. 24, when a pixel of the panoramic image corresponding to the image array [m, n] on the floor surface is sought, the distance $j_n$ is calculated by correcting the distance l to the distance $l_2$, and the image information of [$i_m$, $j_n$] is given to the array [m, n].

Figure 25:
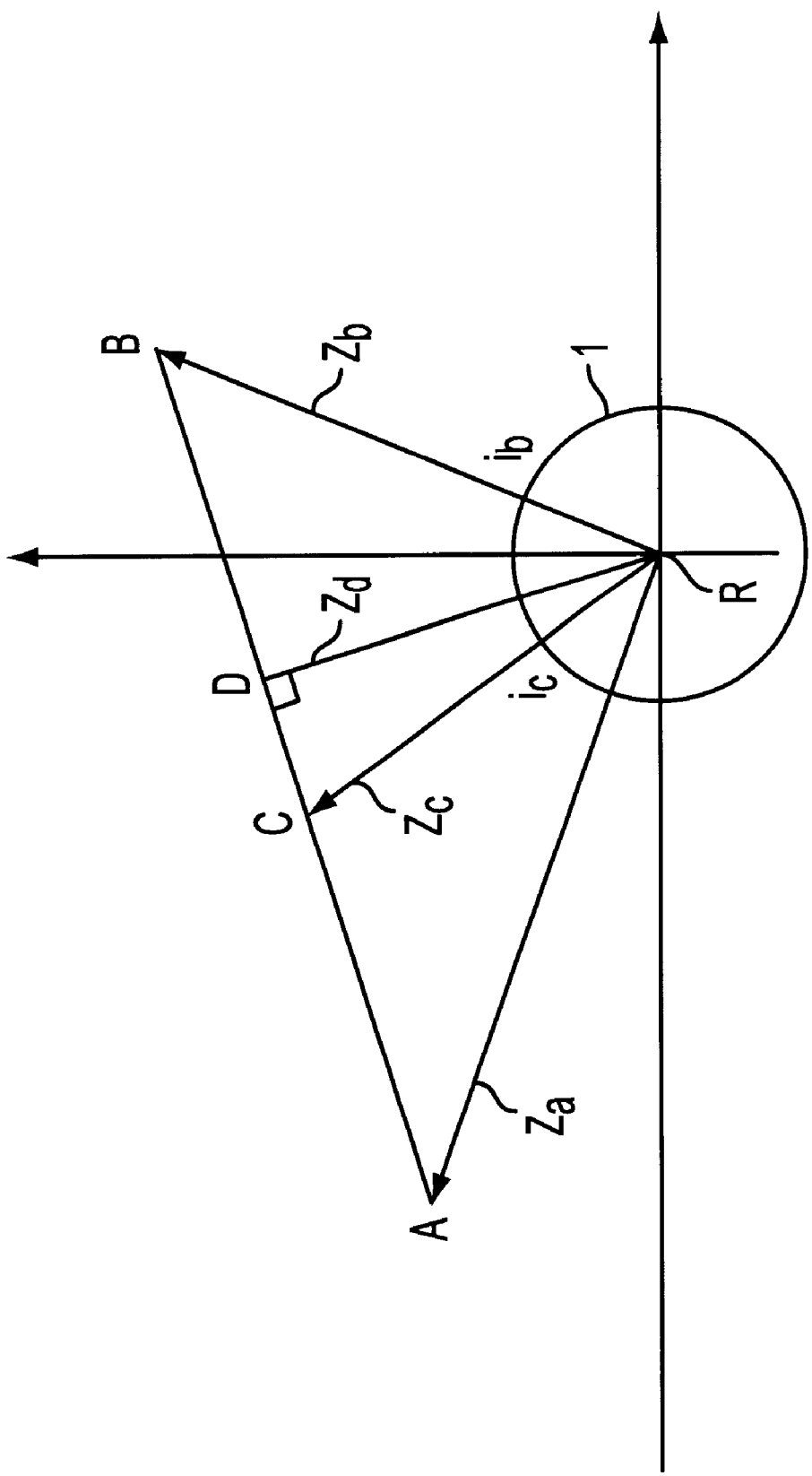
FIG. 25 is a schematic diagram depicting a texture mapping for a wall.

Next, the texture mapping is corrected under the condition that on the wall surface of the 3D model 2, a point C on a beam connecting the vertices A and B each other is also placed on the straight line due to the shape of the room under consideration as shown in FIG. 21. As illustrated in FIG. 25, when it is assumed that a straight line passing through the center line M of the cylindrical body 1 is perpendicularly crossed with the straight line A–B at a point D, an angle θ (∠ARD) is given by the following equation (32) as has been explained with reference to FIG. 4.

$$\cos\theta = \left(\frac{II^2}{I^2 + II^2}\right)^{1/2} \quad (32)$$

wherein $$I = Zb\cos\left(2\pi\frac{i_b - i_a}{L}\right) - Za$$

$$II = Zb\sin\left(2\pi\frac{i_b - i_a}{L}\right)$$

Therefore, when an angle ∠ARD=$θ_c$ is given by $$\theta_c = 2\pi\frac{i_c - i_a}{L}$$

a distance $Z_c$ from the center M of the cylindrical body 1 to the point C may be expressed by the following equation (33).

$$Zc = \frac{Za\cos\theta}{\sin\theta\sin\theta c + \cos\theta\cos\theta c} \quad (33)$$

In this manner, when the horizontal pixel position $i_c$ of the marker corresponding to the point C on the panoramic image is determined, the distance can be determined as long as the wall W1 is flat.

Contrary to this, a distance calculated from the pixel position ($i_c$, $j_c$) of the actual markers $c_1$ and $c_2$ on the panoramic image is given by the following equations (34) and (35) when the view point O is closer to the ceiling.

For a ceiling portion;

$$Zc' = \frac{(H/2 - j_{c1})}{\{r^2 - (H/2 - j_{c1})^2\}^{1/2}}(h - H/2) \quad (34)$$

For a floor portion;

$$Zc'' = \frac{(j_{c2} - H/2)}{\{r^2 - (j_{c2} - H/2)^2\}^{1/2}}(H/2) \quad (35)$$

These distances are not identical with Zc due to an error.

Figure 26:
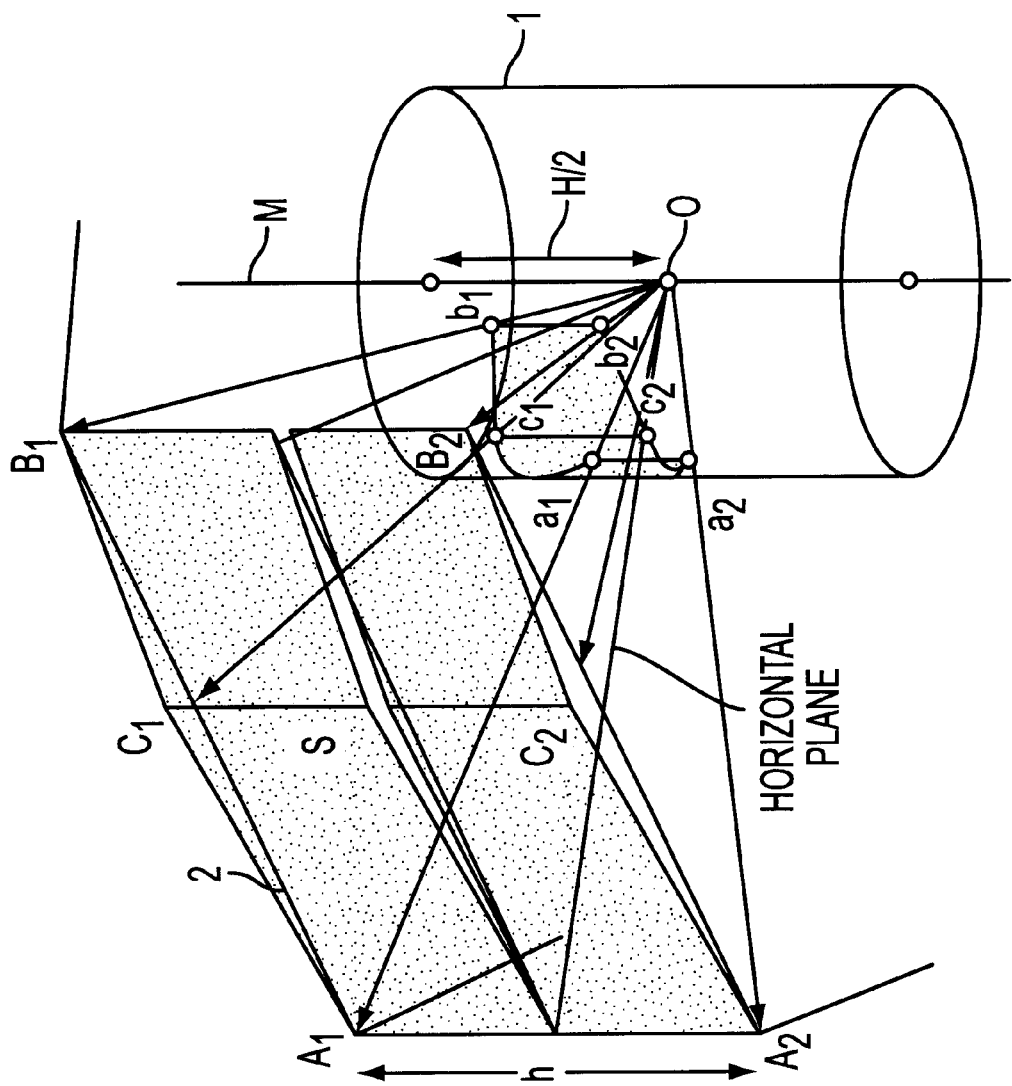
FIG. 26 is a schematic diagram representing another example of an error in a distance from a view point of the 3D model to vertices in the fifth embodiment.

FIG. 26 depicts an example of error introduced in the distance to the wall calculated from the markers when the wall of the 3D model 2 is constructed by a single flat surface. Now correction coefficients $f_{c1}$ and $f_{c2}$ for the upper and lower regions with respect to the view point O like as the equation (26), the following equations (36) and (37) may be obtained.

$$z + f_{c1}(Zc' - z) = Zc$$

$$Zc' = \frac{-z + Zc}{f_{c1}} + z \quad (36)$$

$$Zc'' = \frac{-z + Zc}{f_{c2}} + z \quad (37)$$

Figure 27:
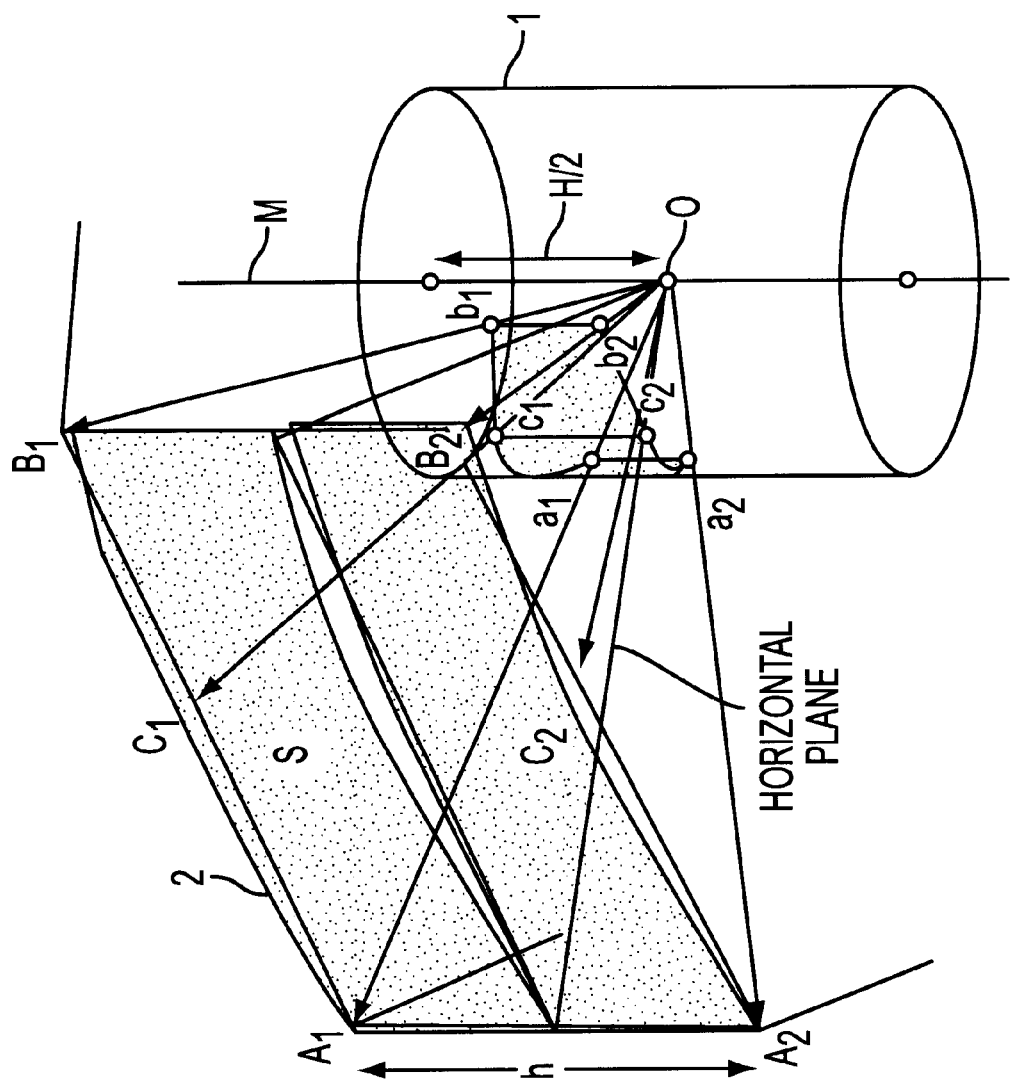
FIG. 27 is a schematic diagram showing another method of the interpolating the distance in the fifth embodiment.

Therefore, in the case shown in FIG. 26, the correction coefficient $f_{c1}$ is changed 1→$f_{c1}$→1 along the points $A_1$, $C_1$, $B_1$ and for the region above the view point O, and 1→$f_{c2}$→$f_b$ along the points $A_2$, $C_2$, $B_2$ and for the region below the view point O. The thus changing correction coefficient may be interpolated as a function of the horizontal pixel position i of the panoramic image or may be a function of the horizontal pixel position p on the wall image. It should be noted that in FIG. 26, the linear interpolation is used, but a curved interpolation is also possible as illustrated in FIG. 27. In this manner, the error between the shape of the 3D model 2 and the shape calculated from the markers on the panoramic image can be corrected.

Operation for performing the fifth embodiment by means of the virtual environment producing apparatus shown in FIG. 7 is substantially identical with that denoted by the flow chart depicted in FIG. 13, and therefore may be dispensed with.

In the present embodiment, upon reconstructing the 3D model, the error in the distance concerning the view point is corrected and no inconsistency is existent between the shape of the 3D model and the texture mapping under such a condition that the height of the room of the model is constant and the beam connecting the corners of the room is straight. Therefore, in addition to the merits of the fourth embodiment, the virtual environment can be realized much more accurately.

The method and apparatus for creating the virtual environment have been explained with reference to the first to fifth embodiments, but it should be noted that the present invention is not limited to these embodiments.

For instance, in the above embodiments, the virtual space is defined to construct the conventional room having four corners defined by respective posts. However, according to the invention, the virtual space may have various shapes other than the rectangular room. Furthermore, the virtual space may not have both the ceiling and floor. For instance, when a room-like space may be constructed by arranging partitions within a large space or open space. Then, the virtual space does not have a ceiling.

Furthermore, the present invention also relates to a record medium on which a computer readable program for carrying out the virtual environment creating method according to the invention has been recorded. Then, by loading the program data recorded on the record medium to a computer, it is possible to perform the method of creating the virtual environment in a simple manner.

Furthermore, the present invention relates to a computer data signal embodied in a carrier wave, wherein said computer data signal is constructed by computer readable program codes for performing the above explained virtual environment creating method.

As explained above in detail, according to the invention, it is possible to create the virtual environment using only the panoramic image constructed from images taken by usual imaging devices such as conventional still cameras and digital cameras without using an expensive distance measuring apparatus such as a range finder as well as data of 3D coordinate information. Therefore, a desired virtual environment can be created by a simple operation with the aid of simple and non-expensive apparatus.

What is claimed is:

1. A method of creating a virtual environment comprising:
   a step of arranging a panoramic image of an inside of a room picked-up from a single view point on a cylindrical body in a virtual space such that information about an angle of view of the relevant panoramic image is reflected;
   a step of arranging a ceiling plane and a floor plane of said room in said virtual space such that the ceiling plane and floor plane are brought into contact with an upper plane and a lower plane, respectively of said cylindrical body;
   a step of deriving a radius (r) of the cylindrical body from a circumferencial length of said cylindrical body corresponding to a length (L) of said panoramic image;
   a step of deriving a height (H) of said panoramic image;
   a step of setting markers (A', B') on the panoramic image, said markers corresponding to vertices (A, B) of a plurality of posts defining a shape of said virtual space, at said vertices the respective posts being brought into contact with the ceiling plane and floor plane, respectively on the virtual space;
   a step of deriving heights (a, b) of said markers on the panoramic image; and
   a step of deriving a distance (Z) from a virtual view point (O) in the virtual space to a post (A–B line) and a height (w) of said virtual view point (O) from said radius (r) of the cylindrical body, said height (H) of the panoramic image and said heights (a, b) of the markers on the panoramic image;
wherein a virtual environment model of the inside of said room is created from the panoramic image.

2. A method according to claim 1, wherein information about a height of another virtual view point in a direction of a line of sight which situates, viewed in a rotational direction on a horizontal plane, between lines of sight which have been used for deriving heights of virtual view points is derived by an interpolation from the previously derived heights of the virtual view points.

3. An apparatus for creating a virtual environment by performing the method according to claim 2, comprising:
   an image display means for displaying a panoramic image;
   a means of setting markers on the panoramic image, said markers corresponding to vertices of a plurality of posts at which the posts are brought into contact with a ceiling plane and a floor plane, respectively in a virtual space; and a means for producing a virtual environment model corresponding to said panoramic image from the panoramic image and positional information of said markers on the panoramic image.

4. A method according to claim 1, wherein a position of a virtual view point having a line of sight corresponding to a beam in the above mentioned virtual environment model created from the panoramic image is shifted in a horizontal plane on which said view virtual point is existent such that the beam is corrected to be straight in the virtual space.

5. An apparatus for creating a virtual environment by performing the method according to claim 3, comprising:
- an image display means for displaying a panoramic image;
- a means of setting markers on the panoramic image, said markers corresponding to vertices of a plurality of posts at which the posts are brought into contact with a ceiling plane and a floor plane, respectively in a virtual space; and
- a means for producing a virtual environment model corresponding to said panoramic image from the panoramic image and positional information of said markers on the panoramic image.

6. A method according to claim 1, wherein image information at a position of the panoramic image is texture-mapped as surface information onto a corresponding position of the virtual environment model constructed from the panoramic image.

7. An apparatus for creating a virtual environment by performing the method according to claim 6, comprising:
- an image display means for displaying a panoramic image;
- a means of setting markers on the panoramic image, said markers corresponding to vertices of a plurality of posts at which the posts are brought into contact with a ceiling plane and a floor plane, respectively in a virtual space; and
- a means for producing a virtual environment model corresponding to said panoramic image from the panoramic image and positional information of said markers on the panoramic image.

8. A method according to claim 1, wherein said virtual space is constructed to have a rectangular shape and said plurality of posts are set at respective corners of said rectangular virtual space.

9. An apparatus for creating a virtual environment by performing the method according to claim 8, comprising:
- an image display means for displaying a panoramic image;
- a means of setting markers on the panoramic image, said markers corresponding to vertices of a plurality of posts at which the posts are brought into contact with a ceiling plane and a floor plane, respectively in a virtual space; and
- a means for producing a virtual environment model corresponding to said panoramic image from the panoramic image and positional information of said markers on the panoramic image.

10. An apparatus for creating a virtual environment by performing the method according to claim 1 comprising:
- an image display means for displaying a panoramic image;
- a means of setting markers on the panoramic image, said markers corresponding to vertices of a plurality of posts at which the posts are brought into contact with a ceiling plane and a floor plane, respectively in a virtual space; and
- a means for producing a virtual environment model corresponding to said panoramic image from the panoramic image and positional information of said markers on the panoramic image.

11. A method of creating a virtual environment comprising:
- a step of arranging a panoramic image of an inside of a room picked-up from a single view point on a cylindrical body in a virtual space such that information about an angle of view of the relevant panoramic image is reflected;
- a step of arranging at least one of a ceiling plane and a floor plane of said room in said virtual space such that at least one of the ceiling plane and floor place is brought into contact with at least one of an upper plane and a lower plane of said cylindrical body;
- a step of deriving a radius (r), a circumferencial length (L) and a height (H) of the cylindrical body as well as an angle of view (θ) at which said panoramic image is picked-up;
- a step of setting, on the panoramic image, markers corresponding to vertices (A, B) of a plurality of posts defining a shape of the virtual space, at said vertices the posts being brought into contact with the ceiling plane and floor plane, respectively of the virtual space;
- a step of deriving heights (a, b) of said markers on the panoramic image; and
- a step of setting a position of the view point (H/2) of said panoramic image, and deriving a distance (Zp) from a virtual view point (O) in the virtual space to a post (A–B line) and a height (w) of said virtual view point (O) as well as a height (h) of said room in the virtual space from said position of the view point (H/2), said radius (r) of the cylindrical body and said heights (a, b) of said markers on the panoramic image;

wherein a virtual environment model within said room is created from said panoramic image.

12. A method according to claim 11, wherein a distance from a view point to a post in the virtual space is corrected under such a condition that walls of said virtual environment model is rectangular.

13. An apparatus for creating a virtual environment by performing the method according to claim 12, comprising:
- an image display means for displaying a panoramic image;
- a means of setting markers on the panoramic image, said markers corresponding to vertices of a plurality of posts at which the posts are brought into contact with a ceiling plane and a floor plane, respectively in a virtual space; and
- a means for producing a virtual environment model corresponding to said panoramic image from the panoramic image and positional information of said markers on the panoramic image.

14. A method according to claim 11, wherein said cylindrical body is corrected into a curved surface in accordance with said angle of view, image information in the panoramic image on the thus corrected curved surface is utilized as texture and is pasted as surface information at a corresponding point of the virtual environment model reconstructed from the panoramic image.

15. An apparatus for creating a virtual environment by performing the method according to claim 14, comprising:
- an image display means for displaying a panoramic image;

a means of setting markers on the panoramic image, said markers corresponding to vertices of a plurality of posts at which the posts are brought into contact with a ceiling plane and a floor plane, respectively in a virtual space; and a means for producing a virtual environment model corresponding to said panoramic image from the panoramic image and positional information of said markers on the panoramic image.

16. An apparatus for creating a virtual environment by performing the method according to claim 11, comprising:

an image display means for displaying a panoramic image;

a means of setting markers on the panoramic image, said markers corresponding to vertices of a plurality of posts at which the posts are brought into contact with a ceiling plane and a floor plane, respectively in a virtual space; and a means for producing a virtual environment model corresponding to said panoramic image from the panoramic image and positional information of said markers on the panoramic image.

17. A computer readable record medium, having a program recorded thereon, wherein said program is to make the computer execute the following procedures for creating a virtual environment from a panoramic image of an inside of a room picked-up from a single view point;

to arrange said panoramic image on a cylindrical body in a virtual space such that information about an angle of view of the relevant panoramic image is reflected and upper and lower planes of said cylindrical body are brought into contact with ceiling and floor planes, respectively of said room;

to derive a circumferencial length, a radius and a height of said cylindrical body;

to derive heights of markers set on the panoramic image, said markers corresponding to vertices of a plurality of posts defining a shape of the virtual space, at said vertices the posts being brought into contact with the ceiling plane and floor plane, respectively in the virtual space; and to derive a distance from a virtual view point in the virtual space to a post and a height of said virtual view point from said radius and height of the cylindrical body and said heights of said markers in the panoramic image, wherein a virtual environment model of the inside of the room is created from said panoramic image.

18. A computer readable record medium, having a program recorded thereon, wherein said program is to make the computer execute the following procedures for creating a virtual environment from a panoramic image of an inside of a room picked-up from a single view point;

to arrange said panoramic image on a cylindrical body in a virtual space such that information about an angle of view of the relevant panoramic image is reflected and at least one of upper and lower planes of said cylindrical body is brought into contact with at least one of ceiling and floor planes of said room;

to derive a circumferencial length, a radius and a height of said cylindrical body as well as an angle of view with which said panoramic image is picked-up;

to derive heights of markers set on the panoramic image, said markers corresponding to vertices of a plurality of posts, at said vertices the posts are brought into contact with the ceiling plane and floor plane, respectively in the virtual space; and to derive a distance from a virtual view point in the virtual space to a post and a height of said virtual view point from a position of said view point set on the panoramic image, said radius of the cylindrical body and said heights of said markers on the panoramic image, and to create the virtual environment of the inside of said room from the panoramic image.

19. A method of creating a virtual environment comprising:

a step of arranging a panoramic image of an inside of an architecture picked-up from a single view point on a cylindrical body in a virtual space such that information about an angle of view of the relevant panoramic image is reflected;

a step of arranging two mutually parallel virtual planes of said architecture in said virtual space such that said two virtual planes are brought into contact with an upper plane and a lower plane, respectively of said cylindrical body;

a step of deriving a radius of the cylindrical body from a circumferencial length of said panoramic image arranged on the circumferencial surface of the cylindrical body;

a step of deriving a height of said panoramic image;

a step of setting markers on the panoramic image, said markers corresponding to two points which situates on said two mutually parallel virtual planes at a same horizontal position;

a step of deriving heights of said markers on the panoramic image; and a step of deriving a distance from a virtual view point in the virtual space to a straight line connecting said two points on said two mutually parallel virtual planes at the same horizontal position and a height of said virtual view point from said radius of the cylindrical body, said height of the panoramic image and said heights of the markers on the panoramic image;

wherein a virtual environment model of the inside of said architecture is created from said panoramic image.

20. A method of creating a virtual environment comprising:

a step of arranging a panoramic image of an inside of an architecture picked-up from a single view point on a cylindrical body in a virtual space such that information about an angle of view of the relevant panoramic image is reflected;

a step of arranging at least one virtual plane within said architecture in said virtual space such that said at least one virtual plane is brought into contact with at least one of an upper plane and a lower plane of said cylindrical body;

a step of deriving a radius, a circumferencial length and a height of the cylindrical body as well as an angle of view at which said panoramic image is picked-up;

a step of setting, on the panoramic image, at least one marker corresponding to a point at which said at least one virtual plane intersects a straight line at right angles;

a step of deriving a height of said at least one marker on the panoramic image; and a step of setting a position of the view point of said panoramic image, and deriving a distance from a virtual view point in the virtual space to said straight line which intersects perpendicularly said at least one virtual plane and a height of said virtual view point as well as a height of the inside of said architecture in the virtual space from said view point on the panoramic image, said radius of the cylindrical body and said height of said at least one marker in the panoramic image; wherein a virtual environment model within said architecture is generated on the basis of said panoramic image.
wherein a virtual environment of the inside of said architecture is created from the panoramic image.

21. A computer readable record medium, having a program recorded thereon, wherein said program is to make the computer execute the following procedures for creating a virtual environment from a panoramic image of an inside of an architecture picked-up from a single view point;

to arrange said panoramic image on a cylindrical body in a virtual space such that information about an angle of view of the relevant panoramic image is reflected and upper and lower planes of said cylindrical body are brought into contact with two mutually parallel virtual planes within said architecture;

to derive a circumferencial length, a radius and a height of said cylindrical body;

to derive heights of markers set in the panoramic image, said markers corresponding to two points which situates on said two mutually parallel virtual planes at the same horizontal position; and to derive a distance from a virtual view point in the virtual space to a straight line connecting said two points on said two mutually parallel virtual planes and a height of said virtual view point from said radius and height of the cylindrical body and said heights of said markers on the panoramic image, and to create the virtual environment model of the inside of the architecture from said panoramic image.

22. A computer readable record medium, having a program recorded thereon, wherein said program is to make the computer execute the following procedures for creating a virtual environment from a panoramic image of an inside of an architecture picked-up from a single view point;

to arrange said panoramic image on a cylindrical body in a virtual space such that information about an angle of view of the relevant panoramic image is reflected and at least one of upper and lower planes of said cylindrical body is brought into contact with at least one of two mutually parallel virtual planes within said architecture;

to derive a circumferencial length, a radius and a height of said cylindrical body as well as an angle of view with which said panoramic image is picked-up;

to derive heights of at least one marker set on the panoramic image, said at least one marker corresponding to a cross point between said at least one of two mutually parallel virtual planes and a straight line which intersects said virtual plane at right angles in the virtual space; and to derive a distance from a virtual view point in the virtual space to said straight line and a height of an inside of the architecture from a position of said view point set on the panoramic image, said radius of the cylindrical body and said height of said at least one marker on the panoramic image, and to create the virtual environment model from the panoramic image.

23. A computer data signal embodied in a carrier wave, wherein said computer data signal is constructed by computer readable program codes for creating a virtual environment from a panoramic image of an inside of an architecture picked-up from a single view point comprising:

a computer readable program code for arranging said panoramic image on a cylindrical body in a virtual space such that information about an angle of view of the relevant panoramic image is reflected and arranging two mutually parallel virtual planes in said architecture on said virtual space such that said two virtual planes are brought into contact with an upper plane and a lower plane, respectively of said cylindrical body;

a computer readable program code for deriving a radius, a height and a circumferencial length of said cylindrical body;

a computer readable program code for deriving heights of markers on the panoramic image, said markers being set at positions on the panoramic image corresponding to two points which situate on said two mutually parallel virtual planes at the same horizontal position; and a computer readable program code for deriving a distance from a virtual view point in the virtual space to a straight line connecting said two points on said two mutually parallel virtual planes at the same horizontal position and a height of said virtual view point from said radius and height of the cylindrical body and said heights of said markers on the panoramic image to create a virtual environment model of the inside of said architecture.

24. A computer data signal embodied in a carrier wave, where said computer data signal is constructed by computer readable program codes for creating a virtual environment from a panoramic image of an inside of an architecture picked-up from a single view point comprising:

a computer readable program code for arranging said panoramic image on a cylindrical body in a virtual space such that information about an angle of view of the relevant panoramic image is reflected and at least one of upper and lower planes of said cylindrical body is brought into contact with at least one of two mutually parallel virtual planes in said architecture within said virtual space;

a computer readable program code for deriving a circumferencial length, a radius and a height of said cylindrical body as well as an angle of view with which said panoramic image is picked-up;

a computer readable program code for deriving a height of at least one marker set on the panoramic image, said at least one marker corresponding to a cross point between said at least one of two mutually parallel virtual planes and a straight line which intersects said virtual plane at right angles; and a computer readable program code for deriving a distance from a virtual view point in the virtual space to said straight line and a height of an inside of the architecture from a position of said view point set on the panoramic image, said radius of the cylindrical body and said height of said at least one marker on the panoramic image to create a virtual environment of the inside of said architecture.

* * * * *